US007885889B2

(12) United States Patent
Oppenheimer et al.

(10) Patent No.: US 7,885,889 B2
(45) Date of Patent: Feb. 8, 2011

(54) SYSTEM AND METHOD FOR PROCESSING DATA PERTAINING TO FINANCIAL ASSETS

(75) Inventors: Dror Oppenheimer, Potomac, MD (US); Maryann Bastnagel, Potomac, MD (US); John L. Kemper, Vienna, VA (US); John A. Simonds, Jr., Durham, NC (US); Mark D. Mathewson, Silver Spring, MD (US); Navdeep Singh, Leesburg, VA (US)

(73) Assignee: Fannie Mae, Washington, DC (US)

( * ) Notice: Subject to any disclaimer, the term of this patent is extended or adjusted under 35 U.S.C. 154(b) by 1047 days.

(21) Appl. No.: 11/015,702

(22) Filed: Dec. 16, 2004

(65) Prior Publication Data

US 2005/0102225 A1 May 12, 2005

Related U.S. Application Data

(63) Continuation-in-part of application No. 10/738,873, filed on Dec. 17, 2003, said application No. 11/015,702 is a continuation-in-part of application No. 10/738,838, filed on Dec. 17, 2003, now Pat. No. 7,461,020.

(60) Provisional application No. 60/530,855, filed on Dec. 30, 2002, provisional application No. 60/437,126, filed on Dec. 30, 2002, provisional application No. 60/436,978, filed on Dec. 30, 2002.

(51) Int. Cl.
*G06Q 30/00* (2006.01)
(52) U.S. Cl. .............................. 705/38; 705/35; 705/36; 705/37; 705/39; 705/40; 705/43
(58) Field of Classification Search ................... 705/35, 705/36, 37, 38, 39, 40, 43
See application file for complete search history.

(56) References Cited

U.S. PATENT DOCUMENTS 3,316,395 A 4/1967 Lavin
(Continued)

FOREIGN PATENT DOCUMENTS

JP 04182868 6/1992
(Continued)

OTHER PUBLICATIONS

Fannie Mae, "Servicing Guide", 1995-2002 et al, 318 pages, Forward, Table of Contents, Sections III, IX, X, and XI, Fannie Mae, USA.
(Continued)

*Primary Examiner*—Nga B. Nguyen
(74) *Attorney, Agent, or Firm*—Foley & Lardner LLP

(57) ABSTRACT

A data processing system for processing loan data for a plurality of loans including a data storage system configured to store loan data for the plurality of loans and a user interface including one or more web pages configured to enable a servicer using a remote computing system to transfer loan data over the Internet to and from the data processing system. The user interface includes a loan activity processing function configured to receive servicer loan data including loan activity data from the servicer, a trial balance processing function configured to enable the servicer to submit servicer loan data for comparison with the stored loan data, and a loan level browsing function configured to allow the servicer to view stored loan data. The data processing system further includes loan process and compare logic which includes an amortization/calculation processor configured to perform validation calculations on servicer loan data based on stored loan data, a loan activity processor configured to process the loan activity data, validate the loan activity data based on the stored loan data, and update the stored loan data based on the loan activity data. The loan process and compare logic further includes a trial balance processor configured to compare servicer loan data with stored loan data.

29 Claims, 17 Drawing Sheets

U.S. PATENT DOCUMENTS

| | | |
|---|---|---|
| 4,774,664 A | 9/1988 | Campbell et al. |
| 4,876,648 A | 10/1989 | Lloyd |
| 5,239,462 A | 8/1993 | Jones et al. |
| 5,258,909 A | 11/1993 | Damerau et al. |
| 5,262,941 A | 11/1993 | Saladin et al. |
| 5,274,547 A | 12/1993 | Zoffel et al. |
| 5,323,315 A | 6/1994 | Highbloom |
| 5,361,201 A | 11/1994 | Jost et al. |
| 5,414,621 A | 5/1995 | Hough |
| 5,537,315 A | 7/1996 | Mitcham |
| 5,563,783 A | 10/1996 | Stolfo et al. |
| 5,611,052 A | 3/1997 | Dykstra et al. |
| 5,615,268 A | 3/1997 | Bisbee et al. |
| 5,673,402 A | 9/1997 | Ryan et al. |
| 5,689,649 A | 11/1997 | Altman et al. |
| 5,696,907 A | 12/1997 | Tom |
| 5,699,527 A | 12/1997 | Davidson |
| 5,732,400 A | 3/1998 | Mandler et al. |
| 5,765,144 A | 6/1998 | Larche et al. |
| 5,797,133 A | 8/1998 | Jones et al. |
| 5,832,461 A | 11/1998 | Leon et al. |
| 5,870,721 A | 2/1999 | Norris |
| 5,878,403 A | 3/1999 | DeFrancesco et al. |
| 5,878,404 A | 3/1999 | Stout, Jr. et al. |
| 5,930,775 A | 7/1999 | McCauley et al. |
| 5,930,776 A | 7/1999 | Dykstra et al. |
| 5,940,811 A | 8/1999 | Norris |
| 5,940,812 A | 8/1999 | Tengel et al. |
| 5,966,693 A | 10/1999 | Burgess |
| 5,966,699 A | 10/1999 | Zandi |
| 5,966,700 A | 10/1999 | Gould et al. |
| 5,970,464 A | 10/1999 | Apte et al. |
| 5,974,372 A | 10/1999 | Barnes et al. |
| 5,983,206 A | 11/1999 | Oppenheimer |
| 5,987,436 A | 11/1999 | Halbrook |
| 5,995,947 A | 11/1999 | Fraser et al. |
| 6,006,207 A * | 12/1999 | Mumick et al. ............... 705/38 |
| 6,012,047 A | 1/2000 | Mazonas et al. |
| 6,014,645 A | 1/2000 | Cunningham |
| 6,021,202 A | 2/2000 | Anderson et al. |
| 6,029,149 A | 2/2000 | Dystra et al. |
| 6,035,288 A | 3/2000 | Solomon |
| 6,044,362 A | 3/2000 | Neely |
| 6,067,533 A | 5/2000 | McCauley et al. |
| 6,070,151 A | 5/2000 | Frankel |
| 6,076,070 A | 6/2000 | Stack |
| 6,088,686 A | 7/2000 | Walker et al. |
| 6,105,007 A | 8/2000 | Norris |
| 6,112,190 A | 8/2000 | Fletcher et al. |
| 6,119,103 A | 9/2000 | Basch et al. |
| 6,125,349 A | 9/2000 | Maher |
| 6,144,948 A | 11/2000 | Walker et al. |
| 6,202,053 B1 | 3/2001 | Christiansen et al. |
| 6,226,624 B1 | 5/2001 | Watson et al. |
| 6,233,566 B1 | 5/2001 | Levine et al. |
| 6,289,319 B1 | 9/2001 | Lockwood |
| 6,304,860 B1 * | 10/2001 | Martin et al. ............... 705/43 |
| 6,311,169 B2 | 10/2001 | Duhon |
| 6,324,526 B1 | 11/2001 | D'Agostino |
| 6,367,013 B1 | 4/2002 | Bisbee et al. |
| 6,385,594 B1 | 5/2002 | Lebda et al. |
| 6,401,070 B1 | 6/2002 | McManus et al. |
| 6,405,181 B2 | 6/2002 | Lent et al. |
| 6,430,539 B1 | 8/2002 | Lazarus et al. |
| 6,438,526 B1 | 8/2002 | Dykes et al. |
| 6,505,176 B2 | 1/2003 | DeFrancesco, Jr. et al. |
| 6,513,018 B1 | 1/2003 | Culhane |
| 6,532,450 B1 | 3/2003 | Brown et al. |
| 6,584,467 B1 | 6/2003 | Haught et al. |
| 6,594,635 B1 | 7/2003 | Erlanger |
| 6,609,109 B1 | 8/2003 | Bradley et al. |
| 6,611,816 B2 | 8/2003 | Lebda et al. |
| 6,633,875 B2 | 10/2003 | Brady |
| 6,651,884 B2 | 11/2003 | Prendergast et al. |
| 6,671,673 B1 | 12/2003 | Baseman et al. |
| 6,684,189 B1 | 1/2004 | Ryan et al. |
| 6,778,968 B1 | 8/2004 | Gulati |
| 6,823,319 B1 | 11/2004 | Lynch et al. |
| 6,988,082 B1 | 1/2006 | Williams et al. |
| 7,085,735 B1 | 8/2006 | Hall et al. |
| 7,089,503 B1 | 8/2006 | Bloomquist et al. |
| 7,107,241 B1 | 9/2006 | Pinto |
| 7,146,337 B1 | 12/2006 | Ward et al. |
| 7,340,424 B2 | 3/2008 | Gang et al. |
| 7,379,912 B1 * | 5/2008 | Camin et al. ............... 705/38 |
| 7,461,020 B2 | 12/2008 | Kemper et al. |
| 7,596,527 B2 | 9/2009 | Sumi et al. |
| 2001/0001148 A1 * | 5/2001 | Martin et al. ............... 705/39 |
| 2001/0029482 A1 | 10/2001 | Tealdi et al. |
| 2001/0032177 A1 | 10/2001 | Starkman |
| 2001/0032178 A1 | 10/2001 | Adams et al. |
| 2001/0037287 A1 | 11/2001 | Broadbent et al. |
| 2001/0044772 A1 | 11/2001 | Allen et al. |
| 2001/0054022 A1 * | 12/2001 | Louie et al. ............... 705/38 |
| 2002/0019804 A1 * | 2/2002 | Sutton ............... 705/38 |
| 2002/0029154 A1 | 3/2002 | Majoor |
| 2002/0029194 A1 | 3/2002 | Lewis et al. |
| 2002/0032635 A1 | 3/2002 | Harris et al. |
| 2002/0032721 A1 | 3/2002 | Chang |
| 2002/0035520 A1 | 3/2002 | Weiss |
| 2002/0038318 A1 | 3/2002 | Cochran et al. |
| 2002/0040339 A1 | 4/2002 | Dhar et al. |
| 2002/0052815 A1 | 5/2002 | Johnson et al. |
| 2002/0052835 A1 | 5/2002 | Toscano |
| 2002/0059131 A1 | 5/2002 | Goodwin et al. |
| 2002/0059137 A1 | 5/2002 | Freeman et al. |
| 2002/0077968 A1 | 6/2002 | Kaniwa et al. |
| 2002/0082984 A1 | 6/2002 | Zappier |
| 2002/0087364 A1 | 7/2002 | Lerner et al. |
| 2002/0087389 A1 | 7/2002 | Sklarz et al. |
| 2002/0091550 A1 | 7/2002 | White et al. |
| 2002/0091630 A1 | 7/2002 | Inoue |
| 2002/0099650 A1 | 7/2002 | Cole |
| 2002/0107818 A1 | 8/2002 | McEwen et al. |
| 2002/0111835 A1 | 8/2002 | Hele et al. |
| 2002/0111891 A1 | 8/2002 | Hoffman et al. |
| 2002/0111896 A1 | 8/2002 | Ben-Levy et al. |
| 2002/0111901 A1 | 8/2002 | Whitney |
| 2002/0123960 A1 | 9/2002 | Ericksen |
| 2002/0138414 A1 | 9/2002 | Baker, IV |
| 2002/0152155 A1 * | 10/2002 | Greenwood et al. ............ 705/38 |
| 2002/0152165 A1 | 10/2002 | Dutta et al. |
| 2002/0152170 A1 | 10/2002 | Dutta et al. |
| 2002/0161699 A1 | 10/2002 | Okamoto et al. |
| 2002/0174046 A1 | 11/2002 | Mistretta |
| 2002/0188535 A1 | 12/2002 | Chao et al. |
| 2003/0018558 A1 * | 1/2003 | Heffner et al. ............... 705/37 |
| 2003/0023610 A1 | 1/2003 | Bove et al. |
| 2003/0028478 A1 | 2/2003 | Kinney et al. |
| 2003/0033229 A1 | 2/2003 | Keyes et al. |
| 2003/0033241 A1 | 2/2003 | Harari |
| 2003/0033242 A1 | 2/2003 | Lynch et al. |
| 2003/0036994 A1 | 2/2003 | Witzig et al. |
| 2003/0036995 A1 | 2/2003 | Lazerson |
| 2003/0036996 A1 | 2/2003 | Lazerson |
| 2003/0046223 A1 | 3/2003 | Crawford et al. |
| 2003/0065614 A1 | 4/2003 | Sweeney |
| 2003/0093366 A1 | 5/2003 | Halper et al. |
| 2003/0110249 A1 | 6/2003 | Buus et al. |
| 2003/0139990 A1 * | 7/2003 | Greco ............... 705/35 |
| 2003/0144949 A1 | 7/2003 | Blanch |
| 2003/0144950 A1 | 7/2003 | O'Brien et al. |
| 2003/0167191 A1 | 9/2003 | Slabonik et al. |
| 2003/0172025 A1 | 9/2003 | Gallina |

| | | | |
|---|---|---|---|
| 2003/0177032 A1 | 9/2003 | Bonissone et al. | |
| 2003/0182159 A1 | 9/2003 | Bonissone et al. | |
| 2003/0187696 A1 | 10/2003 | Bonissone et al. | |
| 2003/0187697 A1 | 10/2003 | Bonissone et al. | |
| 2003/0187698 A1 | 10/2003 | Bonissone et al. | |
| 2003/0187699 A1 | 10/2003 | Bonissone et al. | |
| 2003/0187700 A1 | 10/2003 | Bonissone et al. | |
| 2003/0187701 A1 | 10/2003 | Bonissone et al. | |
| 2003/0187702 A1 | 10/2003 | Bonissone et al. | |
| 2003/0208385 A1 | 11/2003 | Zander et al. | |
| 2003/0212654 A1 | 11/2003 | Harper et al. | |
| 2003/0217034 A1 | 11/2003 | Shutt | |
| 2003/0220879 A1 | 11/2003 | Gaughan et al. | |
| 2003/0225662 A1 | 12/2003 | Horan et al. | |
| 2003/0229553 A1 | 12/2003 | Kongyingyong et al. | |
| 2003/0229581 A1 | 12/2003 | Green et al. | |
| 2003/0233260 A1 | 12/2003 | Snell et al. | |
| 2003/0233316 A1 | 12/2003 | Hu et al. | |
| 2004/0002915 A1 | 1/2004 | McDonald et al. | |
| 2004/0019517 A1 | 1/2004 | Sennott | |
| 2004/0030616 A1 | 2/2004 | Florance et al. | |
| 2004/0030649 A1 | 2/2004 | Nelson et al. | |
| 2004/0034592 A1 | 2/2004 | Hu et al. | |
| 2004/0049439 A1 | 3/2004 | Johnston et al. | |
| 2004/0049445 A1 | 3/2004 | Kishore | |
| 2004/0059653 A1 | 3/2004 | Verkuylen et al. | |
| 2004/0064402 A1 | 4/2004 | Dreyer et al. | |
| 2004/0083164 A1 | 4/2004 | Schwartz et al. | |
| 2004/0107161 A1 | 6/2004 | Tanaka et al. | |
| 2004/0122717 A1 | 6/2004 | Handcock | |
| 2004/0128229 A1 | 7/2004 | Raines et al. | |
| 2004/0128230 A1 | 7/2004 | Oppenheimer et al. | |
| 2004/0138996 A1 | 7/2004 | Bettenburg et al. | |
| 2004/0215554 A1 | 10/2004 | Kemper et al. | |
| 2004/0220873 A1 | 11/2004 | Nolan, III et al. | |
| 2004/0220874 A1 | 11/2004 | Singh et al. | |
| 2004/0225584 A1 | 11/2004 | Quinn et al. | |
| 2004/0225594 A1 | 11/2004 | Nolan, III et al. | |
| 2004/0225595 A1 | 11/2004 | Nolan, III | |
| 2004/0225596 A1 | 11/2004 | Kemper et al. | |
| 2004/0225597 A1 | 11/2004 | Oppenheimer et al. | |
| 2005/0010517 A1* | 1/2005 | Lowenstein et al. | 705/37 |
| 2005/0080722 A1* | 4/2005 | Kemper et al. | 705/38 |
| 2005/0102225 A1 | 5/2005 | Oppenheimer et al. | |
| 2005/0102226 A1 | 5/2005 | Oppenheimer et al. | |
| 2005/0102229 A1* | 5/2005 | Kemper et al. | 705/39 |
| 2006/0074793 A1* | 4/2006 | Hibbert et al. | 705/38 |
| 2007/0016520 A1 | 1/2007 | Gang et al. | |
| 2008/0120211 A1 | 5/2008 | Oppenheimer et al. | |
| 2009/0076973 A1 | 3/2009 | Kemper et al. | |

FOREIGN PATENT DOCUMENTS

| | | |
|---|---|---|
| JP | 2002007701 | 1/2002 |
| JP | 2002259696 | 9/2002 |
| JP | 2002288426 | 10/2002 |
| JP | 2003223559 | 8/2003 |
| WO | WO 9948036 | 9/1999 |
| WO | WO 0021011 | 4/2000 |
| WO | WO 0062209 | 10/2000 |
| WO | WO 0075833 | 12/2000 |
| WO | WO 0116845 | 3/2001 |
| WO | WO 0118718 | 3/2001 |
| WO | WO 01/27832 | 4/2001 |
| WO | WO 0133461 | 5/2001 |
| WO | WO 0139079 | 5/2001 |
| WO | WO 01/41019 | 6/2001 |
| WO | WO 0150318 | 7/2001 |
| WO | WO 0163445 | 8/2001 |
| WO | WO 0163446 | 8/2001 |
| WO | WO 0163534 | 8/2001 |
| WO | WO 0180123 | 10/2001 |
| WO | WO 0198999 | 12/2001 |
| WO | WO 02/06989 | 1/2002 |
| WO | WO 0208855 | 1/2002 |
| WO | WO 0223443 | 3/2002 |
| WO | WO 02/084925 | 10/2002 |
| WO | WO 02093286 | 11/2002 |
| WO | WO 03009152 | 1/2003 |
| WO | WO 03/071380 | 8/2003 |
| WO | WO 03/071388 | 8/2003 |

PUBLICATIONS

Fannie Mae, "Selling", 1995-2002 et al, 1119 pgs, Fannie Mae, USA.

Fannie Mae, "Guide to Underwriting with Desktop Underwriter®", Sep. 2002; 63 pgs.

Edocs, "edocs Teams with Fannie Mae to Offer Lenders Online Account Management Solution," Press Release, Mar. 12, 2001, 2 pgs., edocs, Inc., USA.

Fannie Mae, "Fannie Mae Unveils MORNETPlus on the Web; Lenders Can Now Access Automated Underwriting and Other Mortgage Transaction Services on Fanniemae.com," Press Release, Mar. 23, 2000, 2 pgs., Fannie Mae, USA.

Fannie Mae, "Fannie Mae Announces MORNETPlus Connections; Now Provides Lenders with Access to the Largest Network of Service Providers on the Web for Appraisals, Flood Certificates, Title Insurance and Closing, and Escrow Services," Press Release, Apr. 18, 2001, 3 pgs., Fannie Mae, USA.

Fannie Mae, "Fannie Mae and First American Financial to Provide Lenders with Electronic Access to More Products on MORNETPlus Network; Appraisals, Flood Certificates, and Title Insurance in Offering," Press Release, Dec. 21, 1999, 2 pgs, Fannie Mae, USA.

Raines Franklin D., "Statement by Franklin D. Raines Chairman and CEO of Fannie Mae, Speech at 2003 Fannie Mae eBusiness Forum," Sep. 17, 2003, 6 pgs, Fannie Mae, USA.

Object Management Group, "Fannie Mae", CORBA Banking/Finance, Sep. 17, 2001, 2 pgs, Object Management Group, Needham, MA, USA.

Smith Tom, "E-Commerce Holds Keys to Home Ownership: Fannie Mae drives hug volumes of mortgage business to its e-marketplace," Internetweek.com, Undated, 5 pgs., Internetweek.com, USA.

Smith Tom , "Fannie Mae Ramps up Web Apps: Q&A with Julie St. John , Executive Vice President and Chief Technology Office and Michael Williams President of Fannie Mae e-Business," Internetweek.com, Undated, 11 pgs., Internetweek.com, USA.

Sun, "Success on Sun: Software Development Case Study Federal National Mortgage Association (Fannie Mae)," Mar. 1995, 10 pgs, Sun, USA.

Raines Franklin D., "Speech by Franklin D. Raines Chairman and CEO of Fannie Mae, Fannie Mae and the Mortgage Industry in the E-Commerce Age," May 8, 2000, 20 pgs., Fannie Mae, USA.

Williams Michael, "Technology and Other Keys to the Boom in Refinancing," American Banker, Apr. 20, 2003, 3 pgs, vol. 168, Issue 63, p. 8., American Banker USA.

Breakthroughs in Mortgage Banking: Looking Toward the Future, Real Estate Finance Press, Mortgage Bankers Association of America, 1996, pp. 5-1-5-8, ISBN 1-57599-016-4, Jess Lderman, Editor.

Fannie Mae, "Delivering Loans for MBS", 1996, 138 pages, Fannie Mae, Washington, DC, USA.

Fannie Mae, "Guide to Underwriting with Desktop Underwriter", Oct. 1997, 152 pages, Verison 4.0, Fannie Mae, Washington, DC, USA.

Fannie Mae, "MORNET MBS Pool Submission System User's Guide", Sep. 1998, 259 pages, Version 5.3, Fannie Mae, Washington, DC, USA.

Fannie Mae, "Making Good Delivery A Guide to Delivering Loans for Cash and MBS", 1994, 121 pages, Fannie Mae, Washington, DC, USA.

Fannie Mae, "MORNET Cash Delivery System User's Guide", Nov. 1997, 177 pages, Version 2.6, Fannie Mae, Washington, DC, USA.

Fannie Mae, "Delivering Loans for Cash", 1997, 96 pages, Fannie Mae, Washington, DC, USA.

Fannie Mae, "MORNET Manager User's Guide", Nov. 1998, 187 pages, Version 3.0, Fannie Mae, Washington, DC, USA.

Fannie Mae, "MORNET Servicing Support System User's Guide", Dec. 1998, 370 pages, Fannie Mae, Washington, DC, USA.
Fannie Mae, "Selling", Jun. 30, 2002, 168 pgs, Fannie Mae, USA.
Fannie Mae, "Investor Accounting: Cash", 1996, 132 pages, Fannie Mae, Washington, DC, USA.
Fannie Mae, "Secondary Marketing: Cash", 1997, 81 pages, Fannie Mae, USA.
Fannie Mae, "General Servicing Fundamentals", 1996, 188 pages, Fannie Mae, USA.
Laser Overview, May 1993, chapters 1-18.
U.S. Appl. No. 10/330,346, filed Dec. 30, 2002, Kemper, et al.
Business Wire, Visible Markets Launches World's First Internet-Based Auction Marketplace for Mortgage Backed and Asset Backed Securities, Jun. 26, 2000, 3 pages.
Fannie Mae, "Servicing Guide," 1995-2005, Part 1, 308 pages, Fannie Mae USA.
Fannie Mae, "Servicing Guide," 1995-2005, Part 2, 308 pages, Fannie Mae USA.
Fannie Mae, "Servicing Guide," 1995-2005, Part 3, 307 pages, Fannie Mae USA.
Fannie Mae, "Guide to Underwriting with Desktop Underwriter®," Sep. 2002, 212 pgs.
Notice of Allowance for U.S. Appl. No. 10/738,838, mail date Jul. 31, 2008, 7 pages.
Notice of Allowance for U.S. Appl. No. 10/738,838, mail date Mar. 24, 2008, 7 pages.
Office Action for U.S. Appl. No. 10/738,838, mail date Jun. 2, 2005, 7 pages.
Office Action for U.S. Appl. No. 10/738,838, mail date Apr. 25, 2006, 9 pages.
Office Action for U.S. Appl. No. 10/738,838, mail date Jan. 17, 2007, 7 pages.
Office Action for U.S. Appl. No. 10/738,838, mail date Jul. 17, 2007, 11 pages.
Office Action for U.S. Appl. No. 10/738,873, mail date Dec. 27, 2007, 18 pages.
Office Action for U.S. Appl. No. 10/738,873, mail date Feb. 17, 2010, 12 pages.
Office Action for U.S. Appl. No. 10/738,873, mail date Aug. 12, 2009, 12 pages.
Office Action for U.S. Appl. No. 10/738,873, mail date Nov. 12, 2008, 14 pages.
International Search Report for PCT/US2003/037119, mail date 2005, 2 pages.
International Search Report for PCT/US2003/37120, mail date Jul. 5, 2005, 1 page.
Advisory Action for U.S. Appl. No. 10/738,873, mail date Aug. 2, 2010, 3 pages.
Advisory Action for U.S. Appl. No. 10/331,866, mail date Nov. 3, 2006, 3 pages.
Fannie Mae, "MORNET Servicing Support System User's Guide," Dec. 1998, 365 pages, Fannie Mae, Washington, DC, USA.
International Search Report, International Patent Application No. PCT/US2003/037098, "System and Method for Modifying Attribute Data Pertaining to Financial Assets in a Data Processing System", mailed on Jan. 19, 2005, 3 pages.
Notice of Allowance for U.S. Appl. No. 10/331,866, mail date Jan. 16, 2008, 7 pages.
Notice of Allowance for U.S. Appl. No. 12/019,528, mail date Aug. 26, 2010, 9 pages.
Office Action for U.S. Appl. No. 10/331,866, mail date Jan. 19, 2006, 9 pages.
Office Action for U.S. Appl. No. 10/331,866, mail date Apr. 14, 2005, 8 pages.
Office Action for U.S. Appl. No. 12/019,528, mail date May 18, 2010, 6 pages.
Office Action for U.S. Appl. No. 10/738,873, mail date May 27, 2010, 14 pages.
Office Action for U.S. Appl. No. 10/331,866, mail date Jun. 5, 2007, 10 pages.
Office Action for U.S. Appl. No. 10/331,866, mail date Aug. 11, 2006, 7 pages.
Office Action for U.S. Appl. No. 10/331,866, mail date Oct. 12, 2004, 13 pages.

* cited by examiner

| HELP CENTER  TRAINING  CONTACTS | | LEGAL & PRIVACY | LOGOUT |
|---|---|---|---|
| CORE: SERVICER / INVESTOR REPORTING | | | |
| HOME | BUSINESS FUNCTIONS | SEARCH | | | |

SUBMIT LOAN ACTIVITY REPORT (LAR)                    PRINT... ▼  OK  ⟵ 405

SERVICER NAME   X MORTGAGE CORPORATION   LOAD NO.   500000125
SERVICER NO.    10006-780-3              SERVICER LOAN NO.   100067803

ENTER YOUR LOAN ACTIVITY INFORMATION IN THE FORM BELOW:

| LOAN ACTIVITY | CURRENT | ⟵ 406 |
|---|---|---|
| EFFECTIVE DATE* | | |
| ACTUAL UPB* | | |
| LPI DATE* | [     ] ▼ | |
| PRINCIPAL REMITTANCE* | [     ] ▼ | |
| INTEREST REMITTANCE* | | |
| OTHER FEES COLLECTED | | |
| ACTION CODE | NONE [     ] ▼ | |
| ACTION DATE | | |
| PITI | | |
| BORROWER PRINCIPAL AND NOTE RATE INTEREST | | |
| TAXES AND INSURANCE | | |
| FEES AND OTHER YIELD ADJUSTMENTS | | |
| FEE OR OTHER YIELD ADJUSTMENT TYPE | NONE ▼ | |
| FEE OR OTHER YIELD ADJUSTMENT AMOUNT | | |
| ADD MORE FEE TYPES AND AMOUNTS | | |
| LOSSES: | | |
| LOSS TYPE | NONE ▼ | |
| LOSS AMOUNT | | |
| ADD MORE LOSS TYPES AND AMOUNTS | | |

*=REQUIRED FIELDS

CANCEL  SUBMIT  ⟵ 407

FIG. 4B

CORE: SERVICER / INVESTOR REPORTING

HELP CENTER    TRAINING    CONTACTS                                    LEGAL & PRIVACY    LOGOUT

| HOME | BUSINESS FUNCTIONS | SEARCH |

VIEW TRIAL BALANCE REPORT                                    PRINT... ▶   OK

SERVICER NAME    MORTGAGE COMPANY           LOAN NO.            500002633
SERVICER NO.     10024-002-5                SERVICER LOAN NO.   22604005
PRODUCT LABEL    FIXED INTEREST
PROCESS DATE     10/20/2003 10:49:38 PM     TRANSACTION ID      300498386

ENTER YOUR TRIAL BALANCE INFORMATION AS OF THE END OF LAST MONTH IN THE FORM BELOW:

| | REPORTED | FANNIE MAE EXPECTED | DIFFERENCE |
|---|---|---|---|
| GENERAL | | | |
| EFFECTIVE DATE* | 10/01/2003 | 09/30/2003 | |
| ACTUAL UPB* | $100,000.00 | $100,000.00 | $0.00 |
| NOTE RATE* | 7.0000% | 6.0000% | 1.0000% |
| PASS THROUGH RATE* | 6.5000% | 6.5000% | 0.0000% |
| PRINCIPAL REMITTANCE* | $12,845.00 | $500.00 | $12,345.00 |
| INTEREST REMITTANCE | $88,888.00 | $88,888.00 | $0.00 |
| MORTGAGE PAYMENT* | $599.55 | $599.55 | |
| LPI DATE* | 09/30/2003 | 09/30/2003 | |
| NET ACCRUED INTEREST RECEIVABLE BALANCE* | $1,258.00 | $1,258.00 | $0.00 |

*=REQUIRED FIELDS

CANCEL    NEXT

HELP CENTER   TRAINING   CONTACTS                                                                LEGAL & PRIVACY   [LOGOUT]
CORE: SERVICER/INVESTOR REPORTING

| HOME | BUSINESS FUNCTIONS | SEARCH |

CHANGE VIEW CRITERIA FROM LOAN COMPANY=ALL | REMITTANCE TYPE=A/A | LOCATION=ATLANTA
LOAN ACTIVITY REPORT (LAR) EXCEPTION SUMMARY
SERVICER NAME   X MORTGAGE CORPORATION          TOTAL LOANS        17
SERVICER NO.    10006-780-3                     TOTAL EXCEPTIONS    8

VIEW EXCEPTIONS FOR [ALL TRANSACTIONS ▼] [OK]

[FILTER]   RECORDS FOUND: 6   CURRENT SET: 8   SHOW [10▼] PER PAGE | PAGES 1                                                  [PRINT/DOWNLOAD... ▼] [OK]

| SELECT | SERVICER LOAN NO. | LOAN NO. | TRANSACTION ID | TRANSACTION TYPE | REMITTANCE TYPE | LOAN CATEGORY | POOL NO. | ACTIVITY PERIOD END DATE ▼ | CUT-OFF DATE | SEVERITY | ERROR MESSAGE |
|---|---|---|---|---|---|---|---|---|---|---|---|
| ☐ |  | 500000140 | 300285918 | LPC_PaymentTransaction | A/A | MBS |  | 10/31/2003 | 10/31/2003 | ACCR INT DIFF | REPORTED INTEREST IS WITHIN BOUNDARY, BUT OUTSIDE TOTAL FOR PAYMENT TO PAYMENT. |
| ☐ |  | 500000575 | 300335903 | LPC_PaymentTransaction | A/A | MBS |  | 10/31/2003 | 10/31/2003 | ACCR INT DIFF | REPORTED INTEREST IS WITHIN BOUNDARY, BUT OUTSIDE TOTAL FOR PAYMENT TO PAYMENT. |
| ☐ |  | 500001025 | 300421922 | LPC_PaymentTransaction | A/A | MBS |  | 10/31/2003 | 10/31/2003 | REPT DIFF | REPORTED INTEREST IS WITHIN BOUNDARY, BUT OUTSIDE TOTAL FOR PERIODIC MBS LOAN. |
| ☐ |  | 500001025 | 300421922 | LPC_PaymentTransaction | A/A | MBS |  | 10/31/2003 | 11/05/2003 | REPT DIFF | REPORTED INTEREST IS WITHIN BOUNDARY, BUT OUTSIDE TOTAL FOR PERIODIC MBS LOAN. |
| ☐ |  | 500001025 | 300421922 | LPC_PaymentTransaction | A/A | MBS |  | 10/31/2003 | 11/05/2003 | REPT DIFF | REPORTED INTEREST IS WITHIN BOUNDARY, BUT OUTSIDE TOTAL FOR PERIODIC MBS LOAN. |
| ☐ |  | 500001025 | 300421922 | LPC_PaymentTransaction | A/A | MBS |  | 10/31/2003 | 11/05/2003 | REPT DIFF | REPORTED INTEREST IS WITHIN BOUNDARY, BUT OUTSIDE TOTAL FOR PERIODIC MBS LOAN. |
| ☐ |  | 500000546 | 300333945 | LPC_PaymentTransaction | A/A | MBS |  | 10/28/2003 | 10/28/2003 | HARD REJECT | CURTAILMENT REPORTED ON DELINQUENT LOAN. |
| ☐ |  | 500000560 | 300334918 | LPC_PaymentTransaction | A/A | MBS |  | 10/28/2003 | 10/28/2003 | HARD REJECT | REPORTED PRINCIPAL IS OUTSIDE BOUNDARY. |

SELECT PAGE | SELECT ALL 8 | CLEAR PAGE | CLEAR ALL 8

FIG. 4E

HELP CENTER   TRAINING   CONTACTS                                   LEGAL & PRIVACY   LOGOUT
CORE: SERVICER / INVESTOR REPORTING                                                    — 420

| HOME | BUSINESS FUNCTIONS | SEARCH |

CHANGE VIEW CRITERIA FROM LOAN COMPANY=ALL | REMITTANCE TYPE=A/A | LOCATION=ATLANTA    PRINT/DOWNLOAD... ▼  OK
LOAN LIST
SERVICER NAME   MORTGAGE CORPORATION
SERVICER NO.    10006-780-3

[FILTER]  [A/A ▼]  RECORDS FOUND: 10   CURRENT SET: 10   SHOW [10▼] PER PAGE | PAGES 1

| SELECT | LOAN NO. ▲ | SERVICER LOAN NO. | REMITTANCE TYPE | SCHEDULED UPB ($) | ACTUAL UPB ($) | LPI DATE | ACCOUNTS RECEIVABLE BALANCE ($) | ACCOUNTS PAYABLE BALANCE ($) | LOAN CATEGORY | ACTION DATE | ACTION CODE |
|---|---|---|---|---|---|---|---|---|---|---|---|
| ☐ | 500000125 | 2604005 | A/A | 99,835.59 | 99,918.03 | 10/01/2003 | | | MBS | 10/01/2003 | SKIP PAY |
| ☐ | 500000140 | 2604005 | A/A | 99,846.98 | 99,910.04 | 10/01/2003 | | | MBS | | |
| ☐ | 500000530 | 2604005 | A/A | 89,635.65 | 89,918.03 | 10/15/2003 | | | MBS | | |
| ☐ | 500000575 | 2604005 | A/A | 99,846.98 | 99,910.04 | 10/01/2003 | | | MBS | | |
| ☐ | 500000635 | 2604005 | A/A | 99,918.03 | 100,000.00 | 10/01/2003 | | | MBS | 10/01/2003 | SKIP PAY |
| ☐ | 500001025 | 2604005 | A/A | 99,752.66 | 99,918.03 | 09/01/2003 | | | MBS | | |
| ☐ | 500001160 | 2604005 | A/A | 99,835.59 | 99,918.03 | 10/01/2003 | | | CASH | | |
| ☐ | 500001205 | 2604005 | A/A | 99,835.59 | 99,835.59 | 11/01/2003 | | | MBS | 10/01/2003 | SKIP PAY |
| ☐ | 500002345 | 2604005 | A/A | 99,918.03 | 100,000.00 | 10/01/2003 | | | MBS | | |
| ☐ | 500002360 | 2604005 | A/A | 99,752.66 | 99,835.59 | 10/29/2003 | | | MBS | 10/01/2003 | SKIP PAY |

— 421

SELECT PAGE | SELECT ALL 10 | CLEAR PAGE | CLEAR ALL 10

FIG. 4F

HELP CENTER    TRAINING    CONTACTS                                          LEGAL & PRIVACY    [LOGOUT]

CORE: SERVICER / INVESTOR REPORTING

| HOME | BUSINESS FUNCTIONS | SEARCH |

LOAN DETAIL                                                          [PRINT/DOWNLOAD... ▼] [OK]

SERVICER NAME    MORTGAGE CORPORATION    LOAN NO.    4501749835         TRANSACTION HISTORY    COMMENTS
SERVICER NO.     10006-780-3             SERVICER LOAN NO. 22604005

EXPAND ALL/COLLAPSE ALL    JUMP TO: ACQUISITION & ORIGINATION|LOAN SET-UP|PRODUCT & FEATURES|LOAN ACTIVITY|POOLS|CREDIT ENHANCEMENTS

▲ ACQUISITION & ORIGINATION
▲ LOAN SET-UP
▲ PRODUCT & FEATURES
▲ LOAN ACTIVITY
▲ POOLS
▲ CREDIT ENHANCEMENTS

SYSTEM AND METHOD FOR PROCESSING DATA PERTAINING TO FINANCIAL ASSETS

CROSS-REFERENCE TO RELATED APPLICATIONS

This application claims the benefit under 35 U.S.C. §119(e) of U.S. Provisional Patent Application Ser. No. 60/530,855, entitled "System and Method For Processing Data Pertaining to Financial Assets," filed on Dec. 18, 2003, which is expressly incorporated herein by reference in its entirety. This application is a continuation in part of U.S. patent application Ser. No. 10/738,873, entitled "System and Method For Processing Data Pertaining to Financial Assets," filed on Dec. 17, 2003, pending, which claims priority under 35 U.S.C. §119(e) to U.S. Provisional Patent Application Ser. No. 60/437,126, entitled "System and Method For Processing Data Pertaining to Financial Assets," filed on Dec. 30, 2002, both of which are expressly incorporated herein by reference in their entireties. This application is further a continuation in part of U.S. patent application Ser. No. 10/738,838, entitled "System and Method For Creating and Tracking Agreements for Selling Loans to a Secondary Market Purchaser," filed on Dec. 17, 2003, pending, which claims priority under 35 U.S.C. §119(e) to U.S. Provisional Patent Application Ser. No. 60/436,978, entitled "System and Method For Creating and Tracking Agreements for Selling Loans to a Secondary Market Purchaser," filed on Dec. 30, 2002, both of which are expressly incorporated herein by reference in their entireties.

BACKGROUND OF THE INVENTION

1. Field of the Invention

This invention relates to computer systems and methods used to process data pertaining to financial assets, such as loans, securities, and so on.

2. Description of Related Art

When considering the purchase or refinance of a home, potential home buyers consult mortgage lenders such as mortgage companies, savings and loans institutions, credit unions, state and local housing finance agencies or the like to obtain the funds necessary to purchase or refinance their homes. These lenders make (originate and fund) mortgage loans directly to home buyers or borrowers.

During the term of the loan, the borrower sends monthly payments in connection with the loan to the lender. The function of receiving monthly payments from borrowers and aggregating the monthly payments with monthly payments from other borrowers is commonly referred to as loan servicing. Because the lender receives a fee from the borrower during the life of the loan for performing such servicing, servicing is commonly thought of as an asset which is separate from the loan asset that is sold to the purchaser. In other words, a loan is commonly thought of as comprising both a loan asset (corresponding to the right to receive principal and interest payments from a borrower) and a servicing asset (corresponding to the right to receive a servicing fee from the borrower, typically configured as part of the interest payment). It may be noted that, in some instances, a lender may not be interested in performing loan servicing itself. In such instances, the lender may sell the loan to an entity commonly referred to as a loan wholesaler, which typically will turn around and sell the loan asset to the purchaser and retain the servicing asset. Accordingly, reference will now be made to a "servicer" as a generic way of referring to lenders (in the situation where the lender sells the loan asset to the purchaser and retains the servicing asset so as to perform servicing itself) and wholesalers (in the situation where the lender sells the loan and servicing assets to a wholesaler, and the wholesaler turns around and sells the loan asset to the purchaser but retains the servicing asset so as to perform loan servicing).

The servicer receives monthly loan payments from the borrower during the term of the loan. Typically, the loan payment is due on the first of the month although in many instances a grace period will also exist (e.g., the borrower may be given until the fifteen of the month to make the loan payment and have the payment be considered timely). At some point after the fifteen day of the month and the fourth day of the following month, the servicer will report servicing data (e.g., data regarding borrower payments) to the purchaser.

Typically, both the servicer and purchaser will maintain data regarding principal and interest payments received from borrowers and resulting payments due to investors. However, there are various reasons why the servicer data and the purchaser data may not be in complete agreement, most of which relate to errors in data of one or both entities. For example, in connection with adjustable rate mortgages (ARMs), the interest rate applied to the mortgage typically changes during the term of the mortgage. As a result, instances arise in which the servicer and the purchaser have different data regarding when or how the interest rate applied to an ARM should change, resulting in differences regarding amounts that should be paid to investors. As a practical matter, such differences in data are typically only identified during the term of the loan, when data of the servicer and data of the purchaser do not agree as to how much interest should have been received from the borrower.

Therefore, a need exists for a system and method for facilitating the submission of information to the purchaser while reducing the number of errors that occur and the number of discrepancies that need to be resolved. Further, a need exists for such a system also configured to allow a user to access data stored by the purchaser, and respond to potential problems.

SUMMARY OF THE INVENTION

According to a first preferred embodiment, a data processing system for processing loan data for a plurality of loans including a data storage system configured to store loan data for the plurality of loans and a user interface including one or more web pages configured to enable a servicer using a remote computing system to transfer loan data over the Internet to and from the data processing system. The user interface includes a loan activity processing function configured to receive servicer loan data including loan activity data from the servicer, a trial balance processing function configured to enable the servicer to submit servicer loan data for comparison with the stored loan data, and a loan level browsing function configured to allow the servicer to view stored loan data. The data processing system further includes loan process and compare logic which includes an amortization/calculation processor configured to perform validation calculations on servicer loan data based on stored loan data, a loan activity processor configured to process the loan activity data, validate the loan activity data based on the stored loan data, and update the stored loan data based on the loan activity data. The loan process and compare logic further includes a trial balance processor configured to compare servicer loan data with stored loan data.

According to a second preferred embodiment, a user interface includes one or more web pages configured to allow a servicer to perform functions implemented by a data processing system for processing loans and storing loan data. The functions include a loan activity processing function configured to enable a servicer to provide loan data including activity data to be processed by the data processing system, a trial balance processing function configured to enable the servicer to compare servicer loan data with loan data stored on the data processing system, an exception handling function configured to enable a servicer to access and respond to exceptions generated by the data processing system, and a loan level browsing function configured to enable a servicer to browse and download loan data stored on the data processing system and associated with the servicer.

According to a third preferred embodiment, a data processing system includes a data storage system configured to store loan data related to the plurality of loans, acquisition logic including logic configured to receive information pertaining to loan term, interest rate, principal owed and other parameters for a plurality of loans, and a user interface configured to receive servicer loan data including loan activity data. The servicer loan data is received from a servicer of one or more of the plurality of loans, the user interface including one or more web pages. The data processing system further includes loan process and compare logic configured to receive and process servicer loan data including loan activity data. The data processing system further includes financial asset generation logic configured to facilitate creation and maintenance of a plurality of financial assets backed by the plurality of loans. The acquisition logic, the loan process and compare logic, and the financial asset generation logic are provided on a common integrated data processing platform.

Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

FIGS. 4B-4G are web pages configured to enable a user to access functions associated with the user interface of FIG. 4A;

DETAILED DESCRIPTION OF THE PREFERRED EMBODIMENTS

Figure 1:
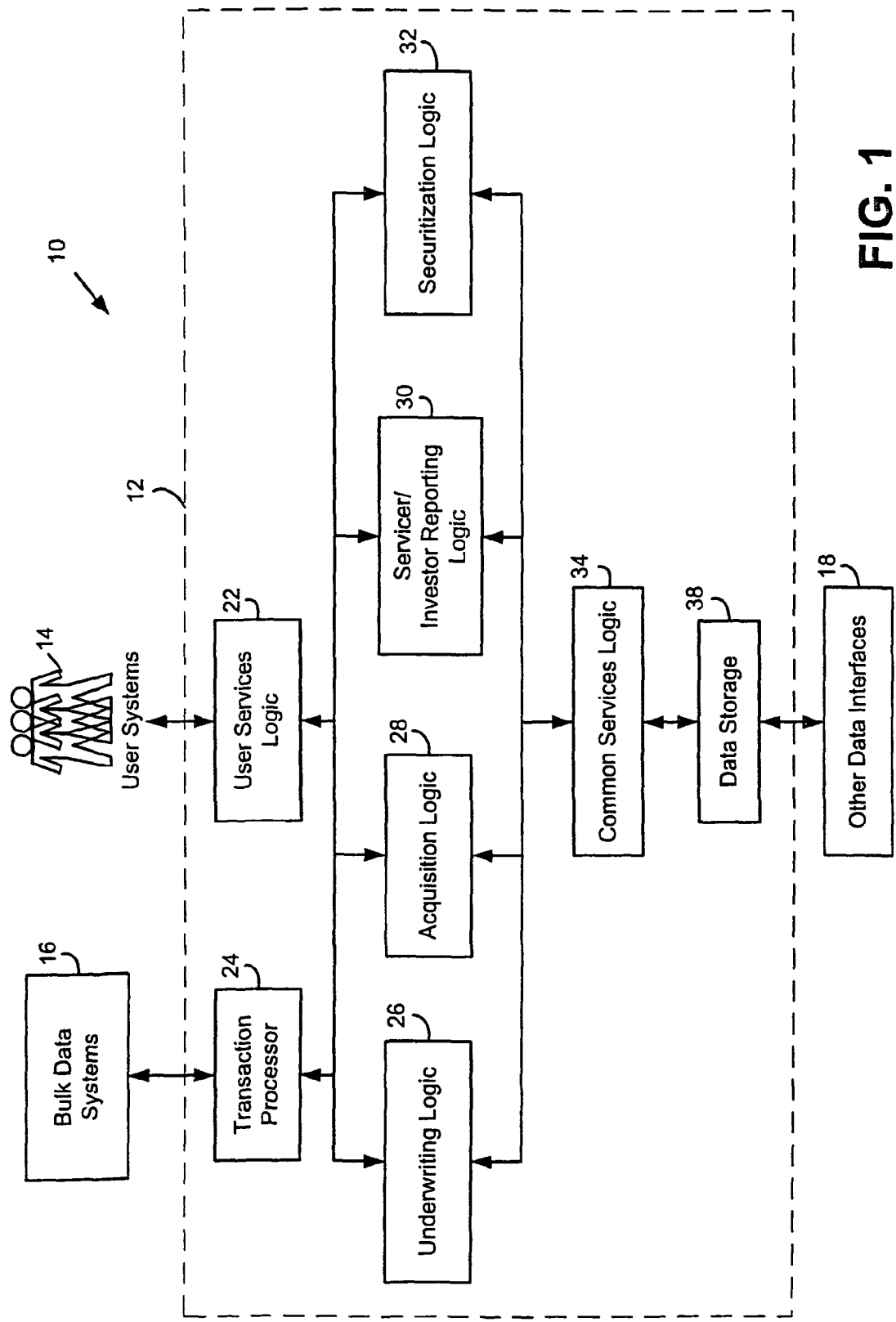
FIG. 1 is a block diagram of a data processing system according to one preferred embodiment.

Referring now to FIG. 1, a computer system 10 for processing data pertaining to financial assets is shown. As shown in FIG. 1, the system 10 comprises a data processing system 12, user systems 14, bulk data systems 16, and other data interfaces 18. The data processing system 12 further comprises user services logic 22, a transaction exchange processor 24, underwriting logic 26, acquisition logic 28, servicer and investor reporting logic 30, securitization logic 32, common services logic 34, a data storage system 38, and other data interfaces 36. Herein, although the term "logic" is used in connection with some blocks and the term "processor" is used in connection with other blocks, these two terms are used interchangeably. The term "processor" is used in the generic sense and is not meant to imply a separate discrete unit of processing hardware.

The data processing system 12 is configured for processing data pertaining to financial assets, such as loans and securities. In one embodiment, the data processing system 12 is configured to be used by a participant in the secondary mortgage market. Herein, for convenience, the participant is referred to as a "purchaser," although it should be understood that the purchaser may participate in the secondary market in other, different, or additional ways (e.g., as a loan guarantor, as a loan securitizer, and so on).

The data processing system 12 is preferably usable to support various types of transactions which may be executed by such a purchaser in connection with one or more loans. For example, the purchaser may purchase loans from lenders or other loan originators as part of a cash execution. The purchased loans may, for example, be held as investments in the purchaser's investment portfolio. Alternatively, the purchaser may create mortgage backed securities (MBS) as part of an MBS execution, or create other financial instruments or assets that are collateralized by cash flows associated with individual loans, including both loans that have been purchased by the purchaser and other loans that have not been purchased by the purchaser. For example, in the case of MBS, the purchaser may acquire a pool of loans, securitize the pool of loans to create MBS that is then sold to investors, and hold the pool of loans in trust for the benefit of the investors. The purchaser may also receive a fee for guaranteeing to holders of MBS or other financial instruments the repayment of the loans by borrowers. The purchaser may also use loans to create other types of financial assets or instruments, for example, by purchasing loans and selling the financial instruments to investors, or by performing such services for other owners of loan assets.

The acquisition logic 28 is preferably usable to perform such operations as receiving information such as loan term, interest rate, principal owed and other parameters regarding loans when loans are first purchased or otherwise acquired and entered into the data processing system 12. In the case of cash executions, the acquisition logic 28 is also used to perform such operations as receiving commitments for the purchased loans.

The servicer and investor reporting logic 30 is used to process periodic loan data for loan accounting purposes and generate accounting output in connection with the purchased loans. Herein, the terms "reporting logic" and "servicer and investor reporting logic" are used interchangeably and both refer to logic that is configured to perform loan accounting and generate accounting output (e.g., for purposes of investor reporting, for purposes of managing a loan portfolio, and so on) in connection with a plurality of loans. The servicer and investor reporting logic 30 preferably performs such functions as receiving loan payment data on an ongoing basis from third party servicers. In this regard, it may be noted that the servicer and investor reporting logic 30 in the illustrated embodiment is not used for servicing loans directly but rather interfaces with a third party servicer. Of course, the servicer and investor reporting logic 30 could also be configured to include additional logic for servicing loans, either as part of the servicer and investor reporting logic 30 or as part of another functional block. The accounting output generated by the servicer and investor reporting logic 30 may include such things as accounting, tax, performance/valuation, and/or other relevant financial information for the loans retained in the portfolio or sold, in whole or in part.

The securitization logic 32 is used to generate financial assets. Herein, the terms "financial asset generation logic" and "securitization logic" are used interchangeably and refer to any logic that is used to generate/create financial assets. Herein, the term "financial asset" is used generically to refer to any asset that is backed by one or more cash flows, and includes such things as assets that are created entirely for internal data tracking purposes (e.g., in the case of packets which do not represent securities), as well as assets that have external significance (e.g., in the case of MBS or other security). The securitization logic 32 may be used to generate financial assets such as MBS or assets that are tracked internally in situations where the owner/operator of the data processing system 12 purchases a pool of loans and holds the loans as an investment in its own portfolio.

It will be appreciated that the data processing system 12 may perform fewer or additional functions as compared to those described herein. For example, an entity that performs only some of the above-mentioned processes may use a computer system that contains only a subset of the functions described herein. Herein, it will be assumed that the data processing system 12 is used to support each of the business processes described above.

Generally speaking, in the illustrated embodiment, there are three access points for external systems into the data processing system 12. Access can include data flow into and out of system 12. A first access point into the data processing system 12 is the user services logic 22 which provides entry to the user systems 14. A preferred implementation of the user services logic 22 is described in greater detail below in connection with FIG. 2. For purposes of explanation, the user systems 14 are assumed to be operated by human users that participate in some way in the above mentioned business processes. For example, the human user may be an employee of a lender or other loan originator that uploads loan information to the purchaser (or corrects, updates, and so on, information that has previously been provided) in connection with committing to deliver or actually delivering a group of loans to the purchaser, an employee of an owner of a portfolio of loans that uploads loan information in connection with a group of loans the owner wishes to have securitized by the purchaser, an employee of a servicer that uploads payment information regarding a group of loans serviced by the servicer, an employee of an institutional investor that downloads information regarding the financial performance or other data regarding investment instruments created and maintained by the purchaser, an employee of the purchaser itself, and so on.

A second access point into the data processing system 12 is the transaction exchange processor 24 which provides entry to the bulk data systems 16. The transaction exchange processor provides an alternative, bulk transfer mechanism for exchanging at least some of the transaction-related data mentioned above in connection with the user systems 14, typically without intervention of a human operator. Such bulk data transfers may occur with lenders, servicers, and so on. The transaction exchange processor 24 receives/sends transactions, and prescreens/sorts/translates data if needed, and makes the transactions/data available for further processing in the data processing system 12 or outbound transmission. A third access point into the data processing system 12 is through the data interfaces 18. The data interfaces 18 may be used to exchange other types of data between other computer systems and the data processing system 12. For example, the data interfaces 18 may be used to import or export data to other external computer systems (that is, computer systems not under the control of the purchaser) or other internal computer systems (e.g., computer systems that are under the control of the purchaser but that provide functionality that is not integrated into the data processing system 12).

The data processing system 12 is described in greater detail below in connection with FIGS. 2-5. As will become apparent from the discussion below, the preferred data processing system 12 exhibits a high level of data, service and time granularity. With respect to data granularity, the system 12 is capable of decomposing loans into a series of highly granular cash flows and tracking all of the cash flows from the point the cash flows enter the data processing system 12 (e.g., as part of a loan payment or other cash flow source) to the point the cash flows exit the data processing system 12 (e.g., as part of a payment on a financial instrument). The decomposition of a particular loan into sub-loan cash flows may occur when the loan is first acquired, later when servicing activity begins on the loan, or at another time. When loan payments are received, the allocation of the loan payment into individual cash flows may be performed by logic executed by the servicer, by the data processing system 12, or by other logic. Ideally, all or nearly all of the cash flow sources associated with a particular loan can be identified and tracked. Additionally, it is also possible to aggregate cash flows from a borrower perspective or other entity perspective. For example, a series of loans (e.g., all to the same borrower) may be aggregated into a higher order cash flow and then the aggregation of the loans may be decomposed. It is also possible to add cash flows to existing loans, for example, so that a new cash flow (e.g., for a new line of credit) may be established without having to set up a new loan. This provides additional flexibility to modify a borrower's loan over time. Thus, the data processing system 12 not only decomposes and maps cash flows associated with such things as principal and borrower paid interest, but also sub-loan level cash flows arising in association with the borrower paid interest or fees associated with the loan such as servicing fees, guarantee fees, mortgage insurance, prepayment penalties, borrower-paid fees, servicer advances, servicer recoveries, and loss/default components, and provides other flexibility. Additional description regarding exemplary possible sources of cash flows is provided at the end of this section. The decomposition and mapping of cash flows dramatically increases the number of different types of financial instruments that may be created, because it makes it possible to create financial instruments based on these other cash flows. In turn, this makes it possible to create financial instruments that are more optimally configured to meet the needs of the owner of the financial instrument.

With respect to service granularity, the data processing system 12 represents loans as a series of attributes and uses a business rules engine to process loan information. This dramatically simplifies the process of expanding the capabilities of the data processing system 12 to process data associated with any type of loan. The capability to process a new type of loan may be added by adding an additional attribute to a list of attributes corresponding to the new product feature (or modifying existing attributes), by using the attribute to indicate the presence or absence (and/or other characteristics) of the new feature in a particular loan, and by modifying the rules engine to incorporate additional rules regarding the new loan feature. It is not necessary to build a completely new data processing system for the new type of loan. This makes it easier to offer new types of loans which are more optimally configured to meet the needs of individual borrowers. An exemplary set of attributes is described at the end of this section.

With respect to time granularity, the data processing system 12 is capable of processing data using a much smaller time slice or update period than has been possible in the past. In the past, systems have typically been constructed around the assumption that servicers provide monthly reports which summarize loan activity that occurred during the previous month. The time slice for reporting has been one month and sub-monthly temporal data has been lost. In the data processing system 12, when information regarding new loans is received by the acquisition logic 28 and/or when information regarding loan payments is received by the servicer and investor reporting logic 30, this information preferably includes information regarding the date the loan was acquired, the date or dates within each month or other period other period on which a payment or other transaction is expected, and/or the date the payment was received. The time slice in the data processing system 12 is therefore one day (or less, if a smaller time slice such as AM/PM, hour, minutes, seconds, and so on, is used). The temporal information is stored and maintained in databases which are synchronized/commonly accessible by the acquisition logic 28, the servicer and investor reporting logic 30, and the securitization logic 32. As a result, the acquisition logic 28, the servicer and investor reporting logic 30, and the securitization logic 32 each have access to this highly granular temporal information regarding loan acquisitions and payments. The increased time granularity supports the above-mentioned capabilities to offer a wider array of loans to borrowers and a wider array of financial instruments to investors. For example, the increased time granularity facilitates offering loan products in which the borrower is expected to make bi-weekly payments, which may be attractive to borrowers that get paid bi-weekly instead of twice-monthly or monthly. This also facilitates handling loan products in which the date of a transaction is meaningful, such as daily simple interest loans. Further, because sub-loan cash flows can be processed using a one day time slice (or less), it is possible to create financial instruments based on cash flows that are processed on a per day basis.

Another benefit of the acquisition logic 28, the servicer and investor reporting logic 30, and the securitization logic 32 being provided on a common platform and having access to common/synchronized databases is that each system has an up to date view of the data. As previously indicated, the data processing system 12 has the ability to accept payment and other transaction information from a servicer as such transactions occur (e.g., using daily, hourly, or near real-time updates) instead of or in addition to receiving end of the month summary transaction information from the servicer. Once the data is received, it is accessible throughout the data processing system 12. For example, it is not necessary to limit the data updates for the securitization logic to a once-per-month basis at the end of a servicing cycle. Therefore, an up to date view of the data is available throughout the data processing system 12.

It should be apparent that it is also possible to construct data processing systems which do not incorporate the advantages described herein in connection with the data processing system 12, or which also incorporate additional advantages not described herein. Further, it may also be noted that-the separation of functionality shown in FIGS. 1-5 is necessarily to some extent conceptual, and it is also possible to provide the same functionality in other ways. Additionally, although numerous functions are described below, it may be noted that it may be desirable to provide fewer, additional, or different functions in a given data processing system depending on the application and what is needed.

Figure 2:
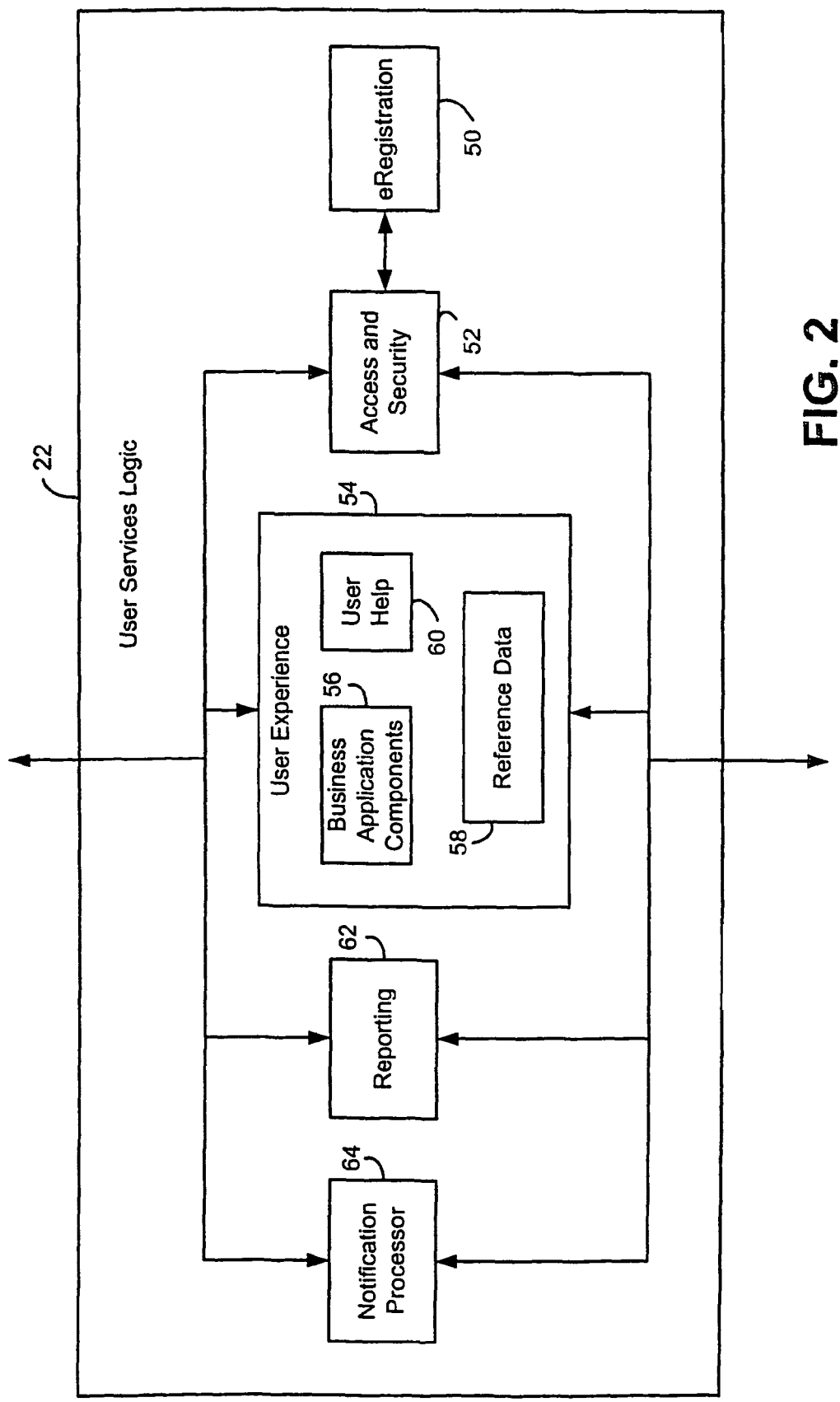
FIG. 2 is a block diagram showing user services logic of the system of FIG. 1 in greater detail.

Referring now to FIG. 2, a preferred implementation of the user services logic 22 and subcomponents thereof will now be described. The user services logic 22 includes electronic registration logic 50, access and security logic 52, user experience logic (i.e., user interface logic) 54, report request processing logic 62, and a notification processor 64. The registration logic 50 is used to register individual users to be able to use the data processing system 12. For example, an employee of a lender may be given a login name and password to access the data processing system 12. User registration preferably includes providing each user with an authorization profile that defines the extent and type of access the user is given to the data processing system 12 and the types of operations that the user may perform while accessing the data processing system 12. The access and security logic 52 cooperates with the electronic registration logic 50 to permit users to access the data processing system 12 in the manner authorized.

The user experience logic (i.e., user interface logic) 54 provides a user interface to the data processing system 12. Preferably, the user accesses the data processing system 12 through the Internet or an Intranet by using a personal/laptop computer or other suitable Internet-enabled device. For example, the data processing system 12 may be accessible to users by visiting the purchaser's web site (that is, the web site of the entity that owns/operates the data processing system 12, and that is assumed to be in the business of purchasing, guaranteeing, and/or securitizing loans) and clicking on appropriate links located at the web site. Depending on the authorizations the user has been given in the registration logic 50, the user is able to access different web pages of the web site relating to the underwriting logic 26, the acquisition logic 28, the servicer and investor reporting logic 30, and the securitization logic 32. For example, there may be one or more web pages relating to acquisitions that may be accessed by lenders, one or more pages relating to servicing that may be accessed by servicers, and so on. The user may then perform functions in accordance with what is permitted by the user's authorization profile (which, in turn, is typically based on the user's employer and the user's job function for that employer). For example, an employee of a lender may be given authorization to access web pages associated with the acquisition logic 28 and commit the lender to deliver a quantity of loans on a future date (i.e., to engage in a forward commitment with the purchaser). The types of operations that different users may perform is described in greater detail in connection with FIGS. 3A, 3B and 5 below.

The user experience logic 54 includes business application components 56, reference data 58, and user help logic 60. These components provide implementation support to the above-described user interface. The business application components 56 includes logic that assists directing the user to the correct web page. The reference data 58 may include data regarding user preferences for the appearance of web pages to the user. The reference data 58 may also provide general reference data and content that assists user interaction with the web site. The reference data 58 may also include data regarding particular lenders, such as the year the lender was first approved to do business with the purchaser, contact information for the lender, and performance information such as statistics and transfer history for the lender. The user help logic 60 provides other help or "How To" components.

The user services logic 22 also includes report request processing logic 62 and a notification processor 64. The report request processing logic 62 permits lenders and servicers to access the data processing system 12 and request reports generated from the data the lenders or servicers have provided the purchaser. The reports may be predefined "canned" reports, or may be ad hoc reports defined by the user by drilling down into the data and/or defining data filters. The type of reporting generation capability available may be made dependent on the type of user. The report request processing logic 62 may be used for incoming data in connection with lenders and servicers and/or for outgoing data in connection with investor reporting. Investor reporting may also be handled by other logic described below.

The notification processor 64 sends notifications/alerts to users. For example, the notification processor 64 may be used to send e-mail (or fax, automated telephone call, and so on) to a user associated with a servicer or lender indicating that data which has been submitted by the servicer or lender has been processed, and that the processed data is ready for review. The notification processor 64 is useful in the context of exceptions processing, when lender/servicer data is processed but the processing indicates that there may be an error in the lender's /servicer's data which requires review by a human operator.

Figure 3A:
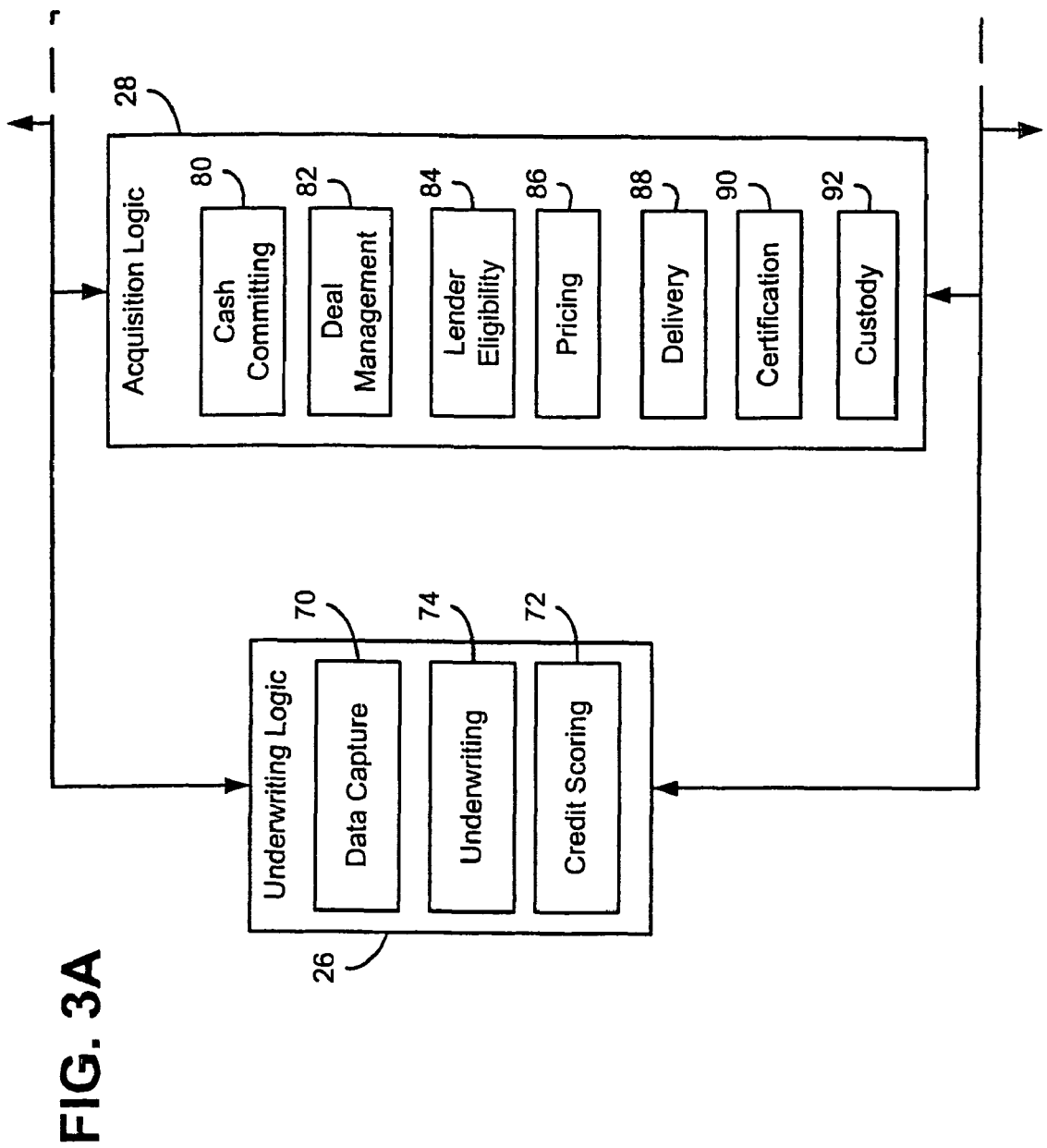
FIGS. 3A-3B are block diagrams showing underwriting logic, acquisition logic, servicer and investor reporting logic, and securitization logic of the system of FIG. 1 in greater detail.

Referring now to FIG. 3A, a preferred implementation of the underwriting logic 26 and subcomponents thereof will now be described. The underwriting logic 26 is typically accessed by users that originate loans, such as lenders and brokers. The underwriting logic 26 includes data capture logic 70, underwriting logic 74, and credit scoring logic 72. The data capture logic 70 is used to receive information to be used in loan underwriting and appraisal (e.g., information from a loan application and a credit report). Typically, the information that is received for loan underwriting is a subset of the information that would be provided on a loan application. The credit scoring logic 72 and the underwriting logic 74 cooperate to analyze the information to determine if the loan meets credit risk and eligibility requirements of the purchaser, and then issue a recommendation based on the assessment of the overall risk profile of the loan. The credit scoring logic 72 generates a credit score of the loan applicant based on the loan applicant's credit history. The underwriting logic 74 then combines the credit score with other information (e.g., debt-to-income ratios, appraisal value, income verification, borrower contribution, cash reserves of the borrower, the existence and amount of subordinate financing, and other factors) to determine whether to approve loan eligibility. The underwriting logic 26 may also be used to generate reports that provide information regarding the underwriting recommendation for a particular loan, information used in determining the recommendation (e.g., property, loan, and borrower information), and information summarizing key statistics from the credit report (e.g., borrower's open accounts, derogatory accounts, and undisclosed accounts).

Still referring to FIG. 3A, a preferred implementation of the acquisition logic 28 and subcomponents thereof will now be described. The acquisition logic 28 further includes cash committing logic 80, deal management logic 82, lender eligibility logic 84, pricing logic 86, delivery logic 88, certification logic 90, and custody logic 92.

The cash committing logic 80 provides a facility for performing all cash commitment functions. Typically, a master agreement/contract may be in place between the purchaser and the lender which defines overall terms of loan sales to the purchaser pursuant to particular commitments. A cash commitment is an agreement (typically, governed by the overall master agreement) in which the mortgage purchaser agrees to buy mortgages from mortgage sellers (e.g., lenders) in exchange for a specified price in cash. Typically, a cash commitment agreement specifies the type of mortgage(s) the seller plans to deliver, the amount of time the seller has to make delivery, the price the mortgage purchaser will pay the seller for the loan(s), other pertinent loan terms, arid, in some cases, loan level details pertaining to the mortgage.

The cash committing logic 80 provides a central point for approved lenders (or other approved sellers) and the purchaser to perform all cash commitment functions. These functions may include, for example, making standard forward commitments, handling pair-off of commitments, extending commitments, over-delivering of a commitment, maintaining configurable parameters, updating contact information, updating commitment records, viewing and selecting from a seller's favorite product list, adding to and maintaining the seller's favorite product list, viewing contracts, fees, prices, price adjustments, and so on. As previously described, the access and security logic 52 verifies the identity of the user (using a login ID and password) and allows the user to gain access to the cash committing logic 80. Different types of users may be granted different levels of access to the cash commitment logic 80 (e.g., for different employees within a seller organization having different levels of authority to act on behalf of the seller).

In the preferred embodiment, the system 12 includes the ability to limit the different types of loans that a given seller may sell to a subset of the loans which the purchaser may purchase. The different products may comprise loans of different terms, different interest rates and types of interest rates (fixed or variable), as well as a variety of other features or combinations of features that may be offered in connection with the particular mortgage products. This information may be stored in the lender eligibility logic 84, described below, and the cash committing logic 80 may interface with the lender eligibility logic 84 to limit commitment activity to only those products that the seller is eligible to sell. During the committing process, the seller selects the type of product the seller plans to deliver from a list of eligible products. Sellers may be provided the ability to flag any eligible product as a "favorite," and are able to select products from a favorites list when making commitments. Preferably, sellers are also provided with the option to assign their own marketing name for each eligible product in the seller's favorites list. In another embodiment, rather than selecting from a list of eligible products, sellers may be provided the ability to define a product they plan to deliver by defining the loan attributes.

The committing logic 80 provides sellers with the option to apply a commitment to a master agreement. Information regarding master agreements is supplied by the deal management logic 82 and displayed in the cash committing logic 80 for a given seller. The display may, for example, indicate valid master agreement numbers, the unfulfilled commitment amount in dollars for each master agreement, the expiration date for each master agreement, and/or other pertinent information.

The deal management logic 82 is used to store and track terms of the deals/contracts made between sellers of loans and the purchaser. When a seller contacts the purchaser to initiate negotiation of a new deal, an employee or other representative of the purchaser uses the deal management logic 82 to create a master agreement, MBS pool contract and all the associated variances.

During the master agreement negotiation process, all terms and stipulations of the agreement are entered into the deal management logic 82. The deal management logic 82 enables authorized users creating or modifying variances to identify editable variances and facilitates transforming "codeable" variances into business rules in the delivery logic. The deal management logic 82 also facilitates communication of these variances to users responsible for analyzing them. Users responsible for analyzing variances are provided a link to the edit engine where they are able to add, modify, or delete edits based on their analyses.

The deal management logic 82 also integrates with the pricing logic 86 so that loan level price adjustments that reflect negotiated variances may be entered and displayed in the generated master agreement. The seller's specific adjustment tables (referencing master agreement and variance reference numbers) may also be stored in the deal management logic or, more preferably, in the lender eligibility logic 84.

The lender eligibility logic 84 is logic that maintains information regarding the eligibility of particular lenders to offer particular products made available by the purchaser. The lender eligibility logic 84 allows users (via web interface) to maintain and update product or lender-specific parameters in connection with the committing logic 80, the delivery logic 88, the certification logic 90, the custody logic 92, and the servicer and investor reporting logic 30. The lender eligibility logic 84 may also be used to set pricing incentive adjustments, other price adjustments, fees and other parameters at the lender and product levels.

The pricing logic 86 is the logic used to generate pricing information and provide the pricing information to other logic in the data processing system 12, including the underwriting logic 26, the committing logic 80, the delivery logic 88, the certification logic 90, the custody logic 92, and the servicer and investor reporting logic 30. For example, the pricing logic 86 may be accessed during delivery to determine the price to be paid for a particular loan, or after the loan is delivered to determine how changes/corrections in loan information affect pricing. The pricing logic 86 takes into account pricing elements such as commitment/interest price (based on interest and the type of commitment), commitment calculations (e.g., for price adjustments associated with pair-offs, over delivery, extensions), and credit adjustment price (based on loan level credit risk). In addition to cash pricing (i.e., pricing in situations where the loan is paid in cash), the pricing logic 86 may also be used for MBS pricing (i.e., pricing in situations where the loan is paid for using a mortgage backed security). The pricing elements related to a MBS include the guarantee fee, the buy-up/buy-down amount, and the credit adjustment amount.

The pricing logic 86 interacts with the delivery logic 88 (described in greater detail below) when a seller is unable to fulfill the terms of its original commitment to generate price adjustments associated with pair-offs, over delivery, and extensions. The pricing logic 86 acquires delivery and under delivery tolerance amounts from the lender eligibility logic 84, processes data from a commitment inventory database to locate expired commitments and under deliveries, based on input from the delivery logic. The pricing logic 86 also processes data associated with the original commitment parameters to generate price adjustments. Additionally, price adjustments may also be assessed at the time of delivery for credit risk in connection with one or more loans that exceeds a pre-determined and agreed-upon level. In particular, at the time a cash commitment or MBS deal is made, a certain level of credit risk is assumed when determining the cash price or MBS guarantee fee. Later, when loans are actually delivered, the true risk level is identified. If the cash price or MBS guarantee fee does not account for this actual level of risk, a price adjustment is made. The system allows the option of selecting either an upfront loan level price adjustment at the time of delivery or a guarantee fee basis point adjustment to permit the payment to be made over time.

The pricing logic 86 also interacts with the servicer and investor reporting logic 30 when there are loan level changes during the servicing of the loan that result in a request for pricing. The servicing logic 28 sends the pertinent data attributes needed for pricing to the pricing logic 28 and the pricing logic 86 returns pricing information for the loan in question.

The pricing logic 86 may also be used to access prices set forth in pricing grids that store pricing information as a function of various loan parameters and/or features, e.g., interest rate and remaining term in connection with a particular seller. The pricing grids may be generated manually (e.g., in a spreadsheet which is provided to the pricing logic 86) or automatically. The pricing logic 86 may also be used to generate reports regarding pricing information.

The delivery logic 88 is the logic used to process loans when loans are delivered to the purchaser in connection with a purchase. The delivery logic 88 analyzes loan attributes, the associated deal/contract with the seller, and execution parameters to determine if the loan is acceptable for submission under the terms and conditions of the deal. The delivery logic 88 also invokes the pricing logic 86 to determine the price and/or price adjustments associated with accepting the loan. The delivery logic 88 also allows sellers to set up pools in cases where the loans are pooled in MBS.

The delivery logic 88 receives electronic loan data by way of the user services logic 22 or the transaction exchange processor 24. The purchaser will generally also receive paper loan documents that support the electronic loan data received by the data processing system 12.

The delivery logic 88 utilizes aspects of the underwriting logic 26, the deal management logic 82, and the pricing logic 86. Each loan that is delivered is checked against business rules and data format rules. Business rules are based on the product, pool/piece/contract, pricing, commitment, and other factors. For example, a seller may inadvertently try to deliver a 15-yr loan in connection with a commitment for 30-yr loans, and the business rules provide a mechanism for identifying that the 15-yr loan can not be used to satisfy that commitment. The delivery logic 88 uses the notification processor 64 to notify the seller when/if the data that is being delivered does not match the commitment. The delivery logic 88 also cooperates with the underwriting logic 26 to confirm that the loans that are being delivered meet underwriting criteria. Sellers are notified using the notification processor 64 when underwriting decisions for a particular loan is different than was anticipated based on the original (typically, incomplete or incorrect) loan data and there is an impact to the price that the seller will be charged. The pricing logic 86 is invoked to determine the change in price.

The delivery logic 88 allows the user to edit the delivery data for format/field edits and standard/custom edits necessary to deliver loans to the purchaser. Users have a real time view of updates to the delivery data in order to resolve data errors before the loan is purchased or securitized. For example, if the data indicates that a 15-yr loan is being used to satisfy a commitment for a 30-yr loan, the user may edit the data to indicate that the loan is a 30-yr loan (in a situation where the loan data was incorrectly entered and what was originally indicated as being a 15-yr loan is in fact a 30-yr loan). Alternatively, the user may edit the data to instead apply the 15-yr loan to a different commitment for a 15-yr loan. As a further alternative, the user may edit the data to substitute a 30-yr loan for the 15-yr loan. The delivery logic 88 also includes logic for address correction (detecting erroneous address information and correcting the address information) and geographic coding (to provide additional geographic information on the property, such as longitude and latitude, tract, congressional district, metropolitan statistical area number, and so on). By the end of the process, the delivery logic also generates a unique loan number for each of the loans for tracking purposes.

The certification logic 90 is logic that supports the process of ensuring that all loan documentation is complete and legally binding and that the paper documentation matches the electronic information delivered by the seller. The certification logic 90 generates, stores and makes available to other aspects of the data processing system 12 information pertaining to which loans have been certified. The certification logic 90 is also able to generate custom reports regarding certification data including reports on loans that have not been certified so that appropriate action may be taken (e.g., having the seller repurchase the loan). The certification logic 90 facilitates data modification and facilitates data matching when loans are redelivered or resubmitted. The certification logic 90 also generates reports to support management decisions with respect to certification activities.

The custody logic 92 is logic that is used to support the custody process, or the process whereby the purchaser stores the paper loan documents during the time from when the loans are purchased or securitized until they are released. Custody protects the physical evidence of investment in negotiable assets. The custody logic 92 manages custodial profile/contact information, custodian/seller relationships, and seller/servicer profile/eligibility information related to custody activities. The custody logic 92 also permits information to be retrieved regarding loan investors. If the market purchaser performs the custody function itself rather than having a third party act as custodian, the custody logic 92 also supports document management in connection with incoming and outgoing documents. In particular, the custody logic 92 tracks when loan documents are in the possession of the purchaser and otherwise manages and monitors the position of the physical loan documents. The custody logic 92 also manages and calculates fees charged for custodial and certification services.

The acquisition logic 28 may also include other logic in addition to the logic described above. For example, the acquisition logic 28 may further include payable/receivable manager logic to track the billing of price adjustments and fees generated by transactions in the committing logic 80, the pricing logic 86, the delivery logic 88, the custody logic 92, and certain aspects of the servicer and investor reporting logic 30. The payable/receivable manager logic may also be used to display the status (including payment status) of such price adjustments and fees in a consolidated manner.

Figure 3B:
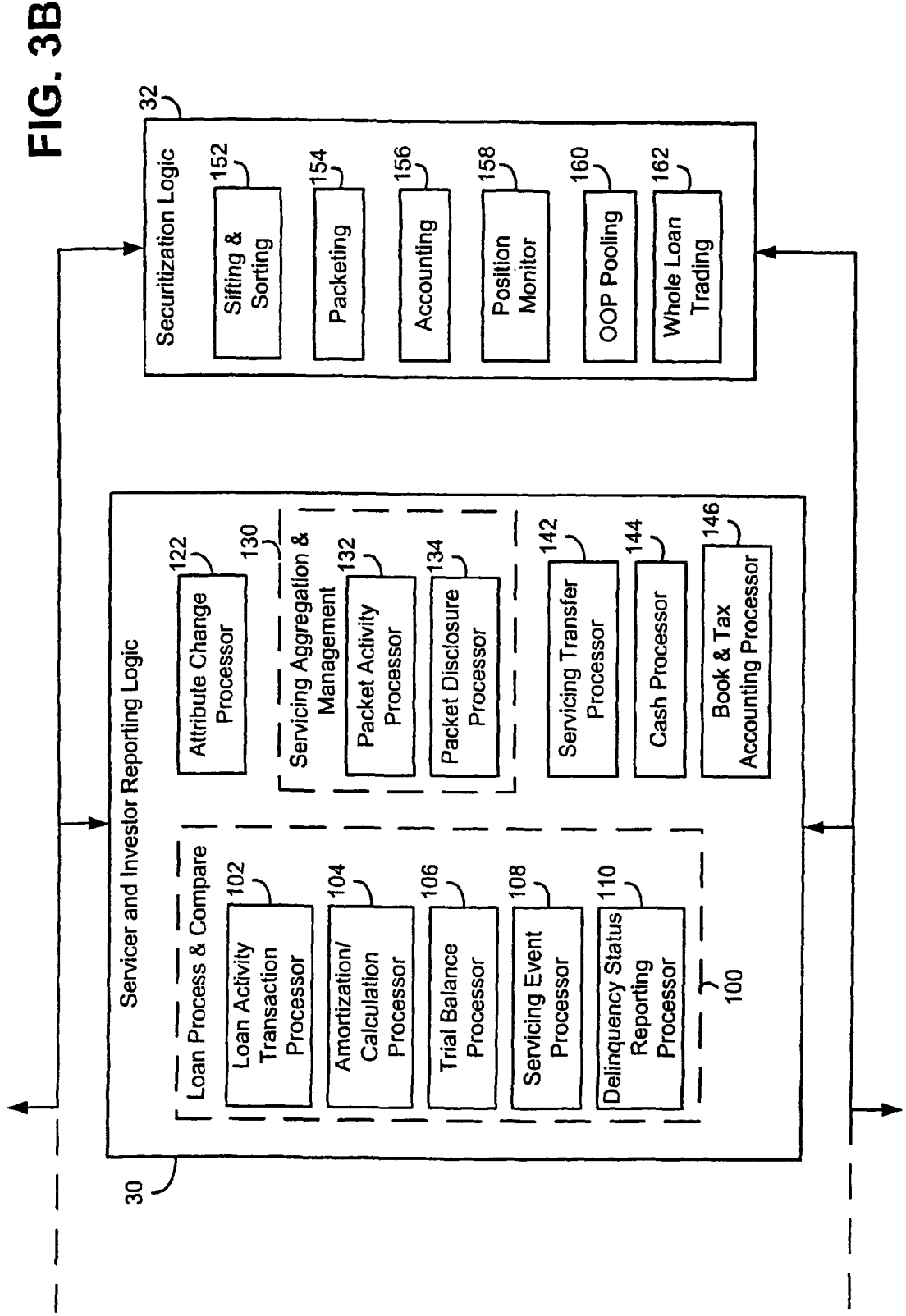
Figure 10:
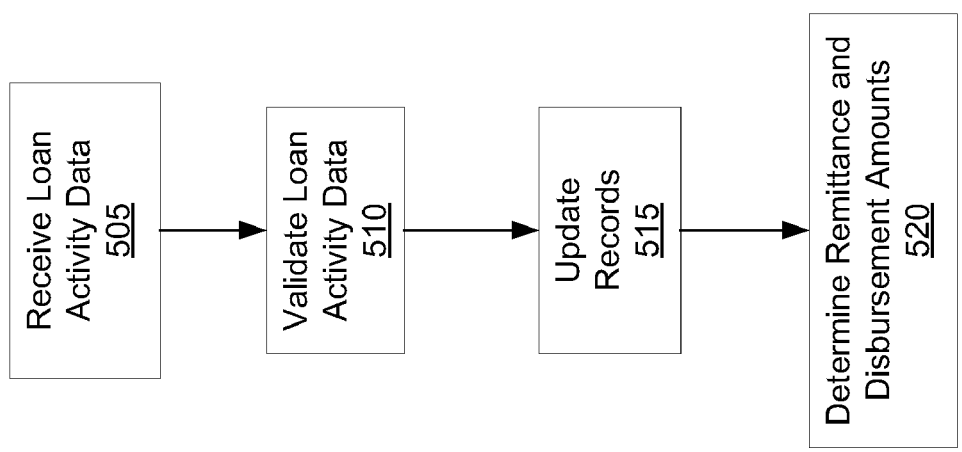

Referring now to FIG. 3B, a preferred implementation of the servicer and investor reporting logic 30 will now be described in greater detail. The servicer and investor reporting logic 30 includes loan process and compare (LPC) logic 100, which monitors and verifies the activities of third party mortgage servicers on an ongoing basis. Alternatively, if servicing is performed internally by the owner of the data processing system 12 and is included as part of the servicer and investor reporting logic 30 or as part of another functional block of the data processing system 12, the LPC logic 100 may be used to verify internally generated reporting information. Accordingly, the owner of data processing system 12 may be the servicer. Thus, as illustrated in FIG. 10, the LPC logic 100 performs such operations as receiving (step 505) and validating (step 510) reporting information pertaining to loan activity, loan delinquency information and unpaid balance comparison reported by the servicer, updating (step 515) the records of the data processing system 100 regarding the status of all reported loans, and determining (step 520) the remittance and disbursement amounts that are expected for the loans.

As an initial matter, prior to loan servicing, a comparison is performed of the servicer's data for loans being serviced with the purchaser's data for the same loans. Even if the purchaser's data has already been compared with lender data for the same group of loans, the servicer's data may for some reason be different. Accordingly, the purchaser may provide a predefined set of acquisition data to the servicer that the servicer can compare with the servicer's data. At any time thereafter, the servicer may perform individual queries of the loan data stored on the purchasers data base via the user services logic 22 (web interface) and download the data for further comparison purposes. When exceptions are noted, the servicer can correct its data or submit a change request via the user interface to the attribute change processor (ACP) logic 122, described below.

During the life of the loan, when loan activity occurs (e.g., when the borrower makes loan payments), the LPC logic 100 is executed with regard to a particular loan when a servicer reports transactions to the purchaser. A loan activity processor 102 handles expected and scheduled servicing transactions including payments, rate changes, curtailments, and so on. The activity processor 102 receives and validates loan transaction data, such as loan activity, unpaid balance comparison, and delinquency status updates. The activity processor 102 also can be configured to check for duplicate transactions, validate servicer information, determine and validate the type of loan transaction, and validate that the loan activity is being reported in the correct reporting period. The activity processor 102 also confirms that changes in unpaid balance and last paid installment are correct, derives expected interest remittance, derives expected principal remittance, and compares the derived amounts to the reported remittance amounts. Whenever a validation operation fails, the activity processor 102 may be configured to generate an exception indicating the nature and scope of the failure. Depending on the nature and scope of the exception, loan activity processing may be interrupted until the exception is resolved. After validation, the status of the loan is made available to the servicer through the user services logic 22. The activity processor 102 also triggers the appropriate cash and accounting transactions in a book and tax accounting processor 146. When loan activity is processed and does not match the purchasers expectations based on rules and calculations, exceptions are noted and communicated to users using the notification processor 64.

The amortization/calculation processor 104 is used by the activity processor 102 to calculate loan level amounts, such as principal and interest due, servicing fees and other data pertinent to each loan. Processor 104 may additionally be used to compute derived or decomposed cash flows, such as a guaranty fee or a servicing fee. Business rules are used to identify scheduled and unscheduled principal, calculate fees, calculate remittance and disbursement amounts, calculate amounts to be disbursed to investors, amortization, and accruals. These calculations are used throughout the system 12 to perform functions such as collecting remittances from servicers, dispersing funds to investors and performing accounting activities. The results of processing are available through an interactive user interface to both personnel of the purchaser and personnel of the servicer for correction when transactions do not comply with business rules.

The trial balance processor 106 provides for validation of parameters such as servicer number, purchaser and servicers loan numbers, effective date, ending unpaid balance, note rate, pass through rate, principal and interest payment, last paid installment (LPI) date, pool number, accrued interest receivable balance, available line of credit, conversion date, reverse mortgage payment, net principal limit, taxes and insurance set asides, property charges set asides, repairs set asides, servicing fees set asides, scheduled payments, and so on. Any discrepancies are resolved and any system updates (loan attribute changes, data updates) are implemented. The LPC logic 100 then reprocesses the activity based on the corrected data.

In addition to borrower payments, the LPC logic 100 may also be triggered with regard to a particular loan when the attribute change processor (ACP) logic 122 makes a change to attributes that affect loan processing or when a loan attribute triggers processing, such as note rate changes, payment changes and loan reporting. The LPC logic 100 may also be triggered by borrower behavior (e.g., loan delinquencies status) at beginning and end of accounting periods.

The servicing event processor 108 identifies and handles business events that are not identified by the activity processor 102. Examples of these events include identifying delinquent loans and identifying loans that are eligible for reclassification or substitution. The delinquency status reporting processor 110 accepts delinquency reasons from the servicer for loans that have payments that are in arrears.

Figure 4A:
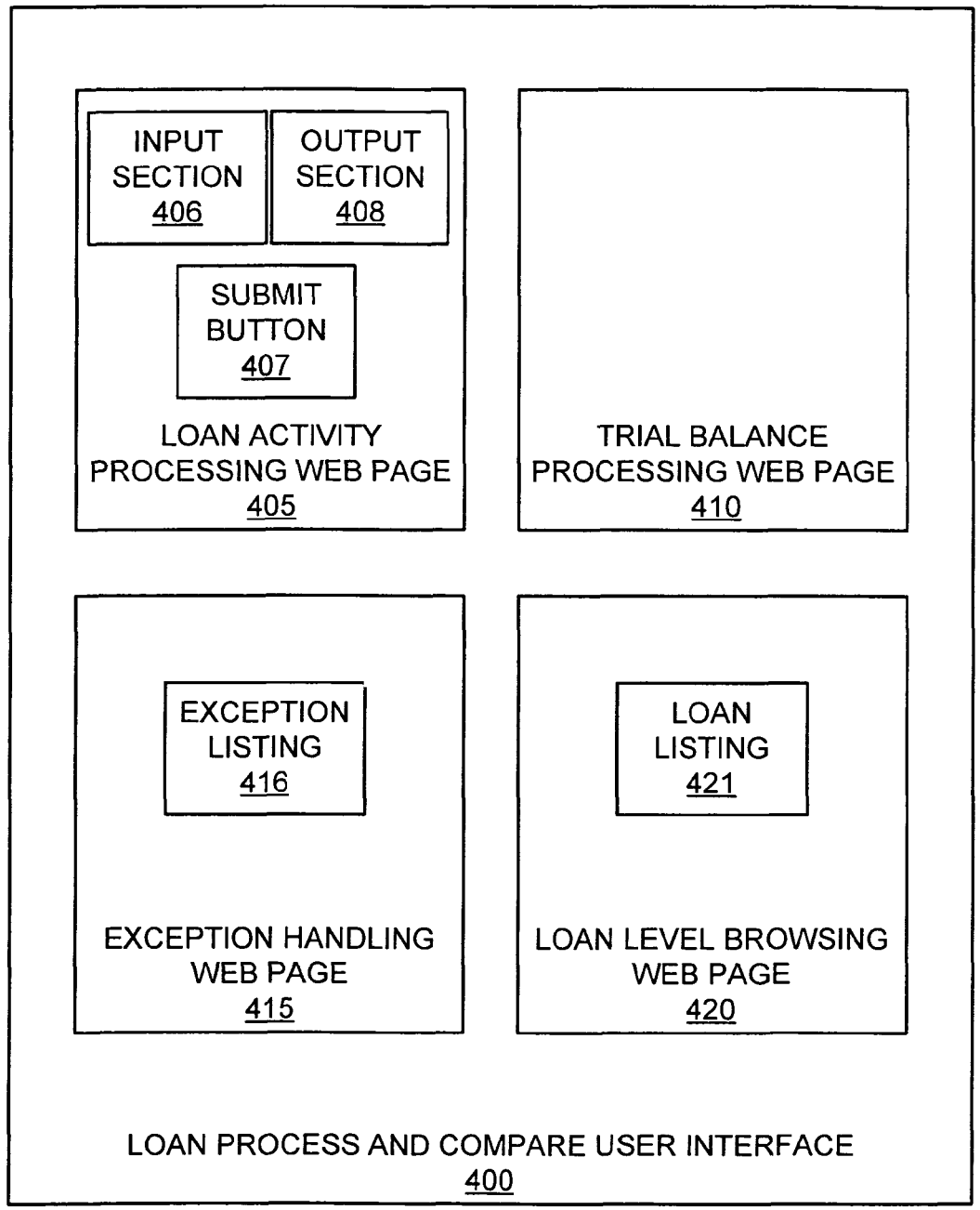
FIG. 4A is a block diagram representing a user interface to a loan process and comparison logic.

Referring now to FIG. 4A, a LPC user interface 400 configured to allow a user to interact with LPC logic 100, is shown according to an exemplary embodiment. The user interacting with LPC logic 100 may be a servicer, a purchaser, a seller, or any other entity.

According to an exemplary embodiment, as previously noted, LPC user interface 400 may be implemented using a web page or series of web pages containing input fields, output fields, informational fields, links to other web pages, etc. LPC user interface 400 may be utilized over any network connection such as the Internet, an intranet, an extranet, etc. According to an exemplary embodiment, LPC user interface 400 is provided as a component of data system 12 including LPC logic 100. User interface 400 may be a component of LPC logic 100, a component managed through user services logic 56, or a stand-alone component.

Figure 4C:

According to an exemplary embodiment, LPC user interface 400, is configured to provide access to a plurality of web pages, such as a loan activity processing web page 405, shown in FIGS. 4B and 4C, a trial balance processing web page 410, shown in FIG. 4D, an exception handling web page 415, shown in FIG. 4E, and/or a loan level browsing web page 420, shown in FIGS. 4F and 4G. Access may be provided, for example, using a first web page having a plurality of links to additional web pages 405-420. According to alternative embodiments, LPC logic user interface 400 may have more, fewer, or different associated web pages. Each web page may be implemented as a frame within a single web page, a stand-alone web page, multiple web pages, etc. According to an exemplary embodiment, user interface 400 may be a LPC logic interface starting web page including hypertext links to each of web pages 405-420.

LPC user interface 400 is configured to provide an interface to allow a servicer or other user to perform loan processing and comparison using LPC logic 100. For example, interface 400 may be used to process loan activity through loan activity transaction processor 102, report a delinquency through delinquency status reporting processor 110, process a trial balance through trial balance processor 106, etc., as described above with reference to FIG. 3B. Interface 400 is further configured to allow the user to access information stored on system 12 and associated with the user, such as loan data, notifications, exceptions, etc. Accessing can include browsing, downloading, manipulating, providing responses, submitting corrections, etc.

According to an exemplary embodiment, interface 400 may include access and security controls such that a user is limited to accessing information and data relevant to that particular user. For example, a servicer may only be able to access loan data for loans associated with that servicer. Accordingly, access and security logic 52 may be utilized in conjunction with a security web page to require that a user submit a user name and user password prior to utilizing interface 400. The user name may further be used as an-identifier to customize helpful information displayed on web pages, display relevant notifications, customize types of information available, etc. For example, an internal user may be granted different and possibly broader permissions compared to an external user.

Referring now to FIGS. 4B and 4C, loan activity processing web page 405 may be implemented as a first web page, shown in FIG. 4B, including an input section 406 and a submit transaction button 407, and second web page, shown in FIG. 4C, including an output section 408, according to an exemplary embodiment. Web page 405 may further include additional and/or different sections such as a help section, an information section, etc. Although described as sections, each section may be implemented as separated web pages as shown in FIGS. 4B and 4C.

Input section 406 includes a plurality of input fields configured to receive information related to activity for at least one loan. The information may be submitted periodically, on demand, based on reached limits, etc. The input fields may be text boxes, drop down menus, selectable lists, or any other type of input field. The content of the input fields may be automatically populated based on the user name, other input fields, or any other criteria.

According to an exemplary embodiment, loan activity processing web page 405 is configured to receive information needed to process loan activity. Accordingly, input fields may provided on loan activity processing web page 405 for a servicer number, a loan number, a servicer loan number, an activity period, a last paid installment date, an actual unpaid principal balance, a principal remittance, an interest remittance, other fees collected, a transaction effective date, a reversal indicator, an action code (such as a skipped payment, a liquidation, etc.), an action date, a curtailment amount, a penalty/fee type, a penalty/fee amount, a draw amount, a draw type, a payment effective date for rate and/or payment change, a new payment amount, a new note rate, a new pass-through rate, an index value used, an extended term, a "Converted to Fixed Rate" indicator, a payment/rate change type code, an expense type, an expense amount, a loss type, a loss amount, transaction specific fields, or any other information to process the loan activity. The input fields may further include an action such as a new transaction, a correction, a reversal, a deletion, etc. configured to request an action from LPC logic 100.

According to an alternative embodiment, interface 400 may be configured to allow a user to upload data stored on a local system to interface 400 and/or LPC logic 100 directly. For example, if the input information described above is stored in whole or in part on a user's system, interface 400 may be configured to allow the user to upload that input information to LPC logic 100. If the information is incomplete, interface 400 may be configured to populate the input fields of web page 405 based on what is in the information and prompt the user for the missing information.

The submit transaction button 407 can be any button or series of buttons that may be used after the input fields have been populated in input section 406 to initiate processing of the data in the input fields by LPC logic 100. Clicking button 407 may initiate the processing, cause a transaction summary and confirmation web page to be displayed, initiate input data verification, or any other step in the processing of the input data.

Referring now to FIG. 4C, output section 408 is configured to display results of the submitted transaction activity. The results can be displayed using text, graphs, tables or any other display method. Exemplary results can include updated loan data based on a successful transaction, a success indication, etc. In the event that the transaction activity processing was not successful, an exception indicating a problem occurred may be generated and displayed. The exception may include additional information indicative of the basis for the exception, the severity of the exception, the action taken based on the exception, etc. For example, exceptions may be generated where a user does not have approved access to the loan entered, where the user's loan data does not match loan data stored on system 12, where the transaction activity is outside of a reporting period, where the transaction activity is non-conforming, etc. Generation of an exception may further cause exception handling web page 415, described below, to be displayed.

Referring now to FIG. 4D, trial balance page 410 may be implemented as a trial balance web page, according to an exemplary embodiment. Trial balance web page 410 is configured to facilitate processing of a trial balance transaction using trial balance processor 106, described above with reference to FIG. 3B. As described above, trial balance processor 106 is configured to compare user loan data with loan data stored on system 12. Trial balance processing may be initiated based on a variety of transactions and/or schedules such as periodically to satisfy reporting requirements, based on an exception, at the user's request, etc.

Similar to loan activity processing web page 405, a user may upload data, initiate processing and view the results of the comparison. The displayed comparison will show whether the user loan data is in conformity with system 12 loan data.

Trial balance processor 106 may further be utilized to process loan data for reporting purposes. Often, a servicer of a loan may have a large number loans that require periodic processing by LPC logic 100 for reporting purposes. Accordingly, trial balance web page 410 may further include a batch processing function configured to receive input for a plurality of loans for processing by trial balance processor 106. Following processing, the results of the batch processing may be reported to the user as described above. The results may further be navigable such that a user may examine results associated with individual loans, loans satisfying certain criteria, etc.

Referring now to FIG. 4E, exception handling page 415 may be a web page configured to allow a user to review and respond to exceptions encountered during activity processing, trial balance processing, or any other activity, according to an exemplary embodiment. Accordingly, web page 415 includes a listing 416 of exceptions that have been generated in association with loans for the user. Each listing entry may include an action that was taken by system 12 based on the exception. For example, transaction processing may have been halted, balances may have been automatically corrected, etc. According to an exemplary embodiment, the listing of exception is navigable, such that a user may scroll through the listing, sort the listing according to different criteria, click on any listing entry to obtain details, etc.

According to an exemplary embodiment, exception handling web page 415 may further including an exception response function configured to allow a user to respond to an exception to resolve and remove the exception through user interface 400. For example, if user loan data does not match system 12 loan data and the user has corrected an error in the user loan data, the exception handling function may be utilized to resubmit corrected user loan data to remove the exception. The complexity of the exception handling function may vary from a simple tool to either approve or disapprove the action taken based on the exception to complex software that will automatically handle the exception or guide the user through steps needed to resolve the exception.

Referring now to FIGS. 4F and 4G, loan level browsing web page 420 may be implemented as a first web page, shown in FIG. 4F, including loan listing 421, and at least a second web page, shown in FIG. 4G, including a loan level detail menu 422, according to an exemplary embodiment. Loan level browsing web page 420 is a web page interface configured to allow a user to browse through loan data stored on system 12. According to an exemplary embodiment, loan level browsing web page 420 is associated with a search function configured to search through loan data on system 12 based on varying criteria. For example, a user may search through loan data to retrieve loans that have not reported activity for the current reporting period.

Loan level data may be displayed in a loan listing 421 on web page 420 similar to the listing described above with reference to exception handling web page 415. The listing may be searched and sorted according to various criteria. Each entry in the listing may also be accessed to retrieve detailed information regarding that entry.

Referring now to FIG. 4G, loan level detailed information can be accessed through loan level detail menu 422 and may include fixed information such as information related to an underlying property associated with the loan, information regarding the parties involved, credit enhancement information, loan features, etc. Alternatively, the information may be dynamic and/or calculated information such as activity information, discrepancy information, associated loan pools, current balances, loan history, and loan performance information.

Web page 420 may further include a download function to allow a user to download retrieved information. The download function may allow the user to download either information specific to a single loan or a batch of loans. The download function may further compare user loan data with system 12 loan data and only download inconsistent or recently modified information.

Interface 400 may also include additional web pages such as a notification web page configured to provide a user with informational updates such as rate changes, delinquency status, limits status, etc. Interface 400 may further include administrative and/or internal web pages that are only available to purchasers. Administrative and/or internal web pages may be used to analyze and or process related to servicers such as average delinquency rates, credit ratings, performance ratings, risk ratings, etc.

Although specific functions, such as batch processing, uploading data, navigable listings, etc. have been described as being associated with specific web pages, these function may alternatively be used in implementing functions described as associated with other web pages.

The attribute change processor (ACP) logic 122 processes loan or security level changes. The ACP logic 122 processes attribute changes regarding loans. As previously described, in the preferred embodiments, loans are characterized in the data processing system 12 by a series of attributes rather than by product codes. Each mortgage product that is purchased is then represented by a series of attributes instead of or in addition to an overall product code. New products may be created by creating new combinations of attributes, or by adding new attributes. An exemplary list of possible attributes that may be used is provided at the end of this section.

The ACP logic 122 processes attribute changes that occur after loans are brought into the data processing system 12. In particular, after loans are brought into the data processing system 12, the ACP logic 122 processes attribute changes that are unexpected or are unscheduled whereas the LPC logic 100 handles attribute changes that are both expected and scheduled. The ACP logic 122 also validates the attribute change request, assesses the financial impact of the change, updates the appropriate data and triggers the appropriate cash and accounting transactions.

Unexpected attribute changes are changes that are required due to new features or discrepancies between contract documentation and data captured by the acquisition logic 26, this can include changes to loan data and/or changes in loan behavior. Unscheduled attribute changes are changes that may occur based on contract documentation but the timeframe is unknown. For example, an unexpected attribute change would be a change for a daily simple interest cash loan that the purchaser has purchased without knowledge of a particular feature. After the purchase, the borrower exercises options under the feature and the servicer advances the next due date of the loan and submits a loan activity transaction record to the purchaser. Not knowing about the feature, the purchaser rejects the transaction since the loan record does not indicate the presence of the feature. After assessing the exception and evaluating the change, the servicer submits an attribute change request to add this feature and keep the loan in the purchaser's portfolio or in the security, pending confirmation of continued loan eligibility. An example of an unexpected and unscheduled attribute change would be the case where the lender submits an adjustable rate mortgage change request for a loan that the purchaser has set up as a fixed rate mortgage. The request is processed as an unscheduled change because the purchaser's systems have never had an event scheduled to trigger the change. An example of an unscheduled change is a fixed rate convertible loan which has the conversion option indicated in the terms of the note. It is anticipated that an attribute change will occur but the timing of the event is unknown and therefore unscheduled. The two primary types of unexpected attributed changes are post purchase adjustments (data corrections) and modifications (attribute changes driven by a number of business requirements, such as product flexibility, delinquency management, and substitutions/reclassifications).

In operation, the ACP logic 122 receives attribute change requests which indicate current database values for the loan and the proposed changes. The validation of the loan with the new values is then accomplished by applying the rules processor 180 to the ACP transaction. The business rules engine is applied to determine whether the changes are allowable and any failed business rules are provided to an operator for further review. Next, the original terms of the contract are used to determine any pricing adjustments of the attribute change. The system determines the difference between the current or adjusted price as applicable and the new price for the purchase adjustments. Next, a human operator reviews the requested change, the impact of the requested change, and any required hard copy documentation needed to justify the change. The operator/business analyst either approves or rejects the change. Rejected transactions may be modified and resubmitted. Approved adjustment transaction values are applied to the database and an audit trail history is maintained. If the result of the change request has an accounting impact, the ACP logic 122 also generates the appropriate transactions to trigger the accounting processor 146.

The ACP logic 122 also includes loan conversion request processing logic for handling loan conversion requests. Thus, when a loan conversion request is received, this logic tracks the request for the change, determines the allowability of the change based on business rules, and employs the remainder of the ACP logic 122 to make the change.

The securities aggregation and management (SAM) logic 130 receives the loan level cash flow information produced by the LPC logic 100 and aggregates this cash flow information to produce security level information. The security level information is produced at each of the following levels: remittance/express date level within each piece/single pool; single pool level or piece level within each major pool; pseudo pool (pool-like reporting group) level; major header level for each major pool; choice pool level; strip level; mega pool level; and mega in mega (MIM) pool level. In addition to securities, the SAM logic 130 is also capable of processing and managing any grouping of loans, cash flows from loans, and other financial instruments. Using a packet activity processor 132, the SAM logic 130 determines the loans in a given pool, aggregates cash flows based on the pool and loan level attributes for all the loans and then updates the system database. The packet activity processor 132 has the flexibility to aggregate loan level cash flows at the most granular level to security level enabling the SAM logic to also manage specific cash flow strips (e.g., access yield strips, interest only strips). At the end of appropriate processing periods, the SAM logic 130 finalizes the relevant security information. The SAM logic 130 then uses a packet disclosure processor 134 to make final remittance level principal and interest, guaranty fee, and other draft amounts available to a cash processing logic 144 and to make security accounting data available to a book and tax accounting logic 146. The SAM logic 130 also calculates, at the various MBS security levels, disclosure data for investors and the payment distribution to investors. The SAM logic 130 also includes packet modification request processing logic which is used to modify packets in generally the same manner that the attributes of loans are modified as described above in connection with the ACP logic 122. The operation of the SAM logic 130, and in particular packets and the packet activity processor 132, is described in greater detail in connection with the packeting logic 154.

Further, the SAM logic 130 can be used to facilitate the provision of real-time data updating. For example, investors may be supplied with real-time analytic data. The analytic data may include any data that allows investors to more accurately determine the value of their holdings, such as data concerning monthly loan payments, loan prepayments, loan pay-offs, and so on. For example, when a loan pays off, investors may be provided immediate access to this information rather than waiting until the next MBS reporting cycle.

Figure 5:
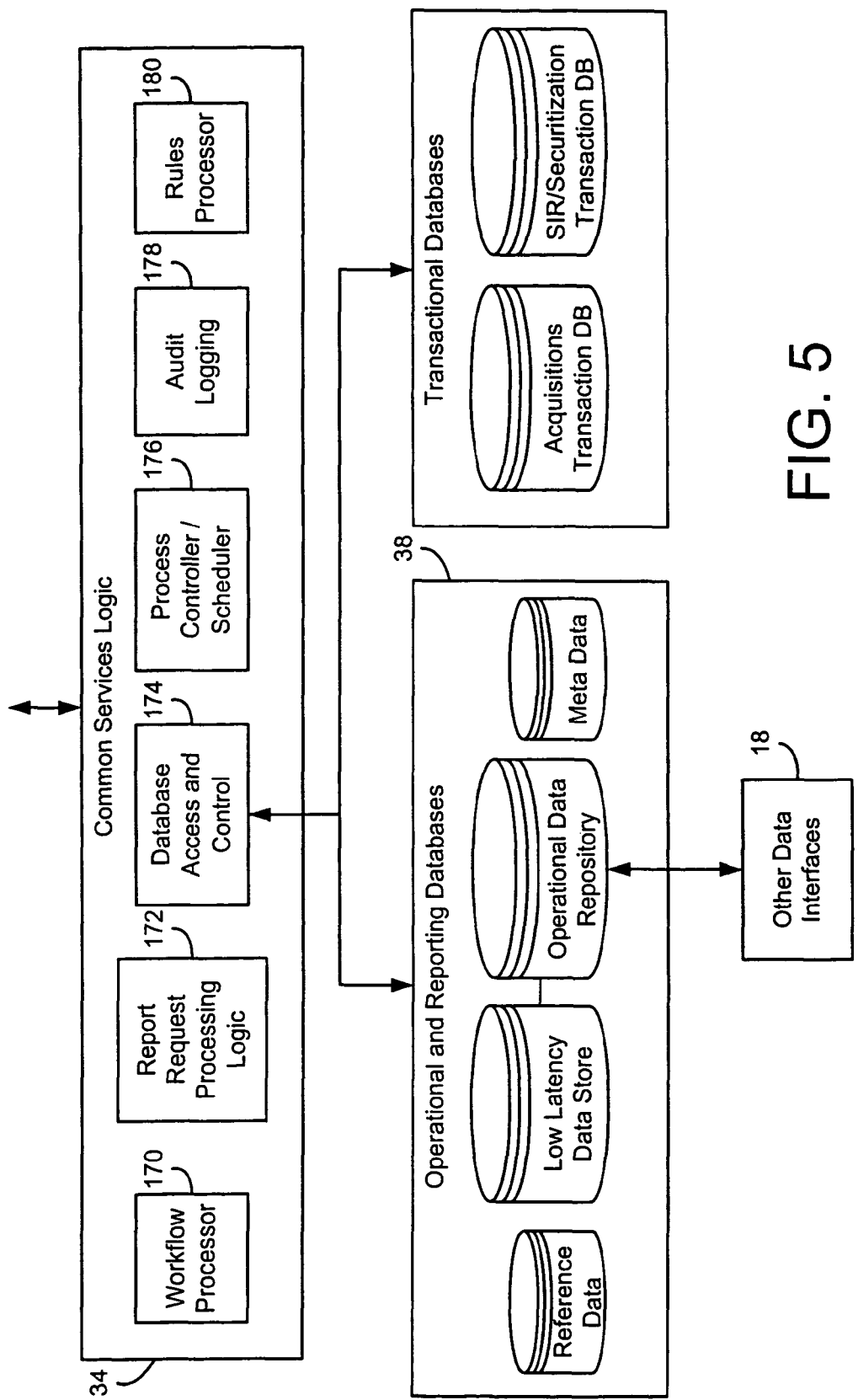
FIG. 5 is a block diagram showing common services logic of FIG. 1 in greater detail.

In the illustrated embodiment, the servicer and investor reporting logic, 30 and the securitization logic 32 utilize the same data base (see FIG. 5). As a result, the data used by the securitization logic 32 is always synchronized with the data used by the servicer and investor reporting logic 30. Thus, it is not necessary for the securitization logic 32 to wait until the end of a periodic (e.g., monthly) reporting cycle to receive updated data, but rather the securitization logic 32 always has access to up-to-date loan information. In another embodiment, the servicer and investor reporting logic 30 and the securitization logic 32 may utilize different data bases that are synchronized on a weekly basis, on a daily basis, on a sub-daily basis, or in real time, depending on the frequency of update that is desired.

A servicing transfer logic 142 facilitates the process of transferring loans for the servicing rights of owned or securitized mortgages from one servicer to another or from one portfolio to another within the same servicer as of an effective date. A servicing transfer may be initiated, for example, if a servicer decides to stop servicing loans for business reasons, if a servicer decides to transfer a certain group of loans to another branch or portfolio, if a servicer is involved in a merger or acquisition of the servicer necessitating a transfer to the surviving entity, or for other reasons. The servicing logic 142 processes information regarding the old and new servicers and the loans that are subject to the change in servicing and updates loan record data for the respective affected loans. The effective date of the change in servicing is also specified. Information that is provided to the servicing transfer logic 142 as part of a servicing request includes the transferors servicer number, address and contact information, the transferees servicer number, address and contact information, unique loan numbers to be transferred, effective date, and other data. Additional steps, such as notifying the transferor of the termination and assessing transfer fees may also be performed.

The cash processor 144 provides a facility to allow servicers and other vendors to create and maintain bank account information. The accounts are bank accounts established with the purchaser to facilitate loan transactions. Servicers have the ability to create/select/update their account information in real time, including account numbers and remittance/disbursement information. The information captured in this process allows the cash processor 144 to create and execute Automated Clearing House (ACH) transactions. Historical records of servicers and vendors account and draft information is maintained to assist in resolving any issues that may arise.

Additionally, the cash processor 144 retrieves remittance and disbursement information from other areas of the data processing system 12. The remittance and disbursement information includes effective date, loan number, dollar amount, remittance code, and granular level details. The cash processor 144 performs a rollup of loan level details by servicer number as required. The cash processor 144 also performs a rollup of loan level details by seller number whenever the seller is not the designated servicer. The cash processor 144 triggers appropriate accounting transaction codes as needed that allow the book and tax accounting processor 146 to record applicable accounting entries.

Finally, the cash processor 144 creates cash transactions, for example, automated clearing house (ACH) transactions, outgoing check transactions, and so on. The cash processor 140 begins this process after the cash processor 144 has completed the process of assessing and validating remittance and disbursement data. The first step in creating a cash transaction is validating servicer/vendor bank account information. Ultimately, an ACH transaction is created that debits or credits the appropriate custodial bank account.

The book and tax accounting logic 146 manages accounting activities associated with the loans. The accounting logic 146 provides a consistent methodology for the recording of accounting events related to mortgage business activities across the acquisition logic 28 and the servicer and investor reporting logic 30 into subsidiary ledgers for posting to a general ledger. The book and tax accounting logic 146 supports the accounting activities related to the packaging of loan cash flows to the first level packet for the securitization logic 32. In addition, the book and tax accounting logic 146 supports the accounting activities related to forming securities or packets out of portfolio loan collateral. The investment accounting for securities held in portfolio and for the payment distribution on mortgage derivatives could also be handled by the book and tax accounting logic 146 or, preferably, is handled by separate accounting logic 156, described in greater detail below.

The book and tax accounting logic 146 journalizes mortgage related business activity, maintains subsidiary ledgers, provides audit trails, provides data integrity and control within the subsidiary ledgers, facilitates timely reconciliations, provides flexibility to account for new products or changes depending on actual accounting methodologies, and provides information needed to perform financial analysis. In one embodiment, the book and tax accounting logic 146 utilizes an accounting matrix which is a two-dimensional structure comprised of accounting "families" and "family members." The families are groups of accounting relevant transaction and loan attributes, and the family members are the allowable values for each of the groups. All intersections of families and family members have a debit and credit account number associated with each of the intersections. When the journal entry is created, the appropriate debit and credit account numbers are first assigned to each of the transactions as they are processed. The accounting matrix uses business rules processor 180 to automatically interpret the transactions. As new products are introduced, the accounting matrix is modified to incorporate new family and/or family members to properly record the new business activity. Similarly, as products become obsolete, or as the requirement for breaking out activity on the corporate general ledger becomes less detailed, the accounting matrix can be modified to adapt to those changes as well.

As business activities are processed, they are recorded/journalized in a subsidiary ledger according to the debit and credit account numbers assigned from the accounting matrix. This occurs by translating business activities into family and family member transactions that can be interpreted by the matrix. A subsidiary ledger provides the capability to view the lowest level of business activity that created the entry in the subsidiary ledger to maintain an audit trail for the subsidiary ledger activity. As activity is recorded, a system walk forward test of the subsidiary ledger balances is also performed to assure data integrity with the subsidiary ledger. At the end of accounting cycles, activity within the subsidiary ledgers is automatically summarized and posted to the general ledger.

At the end of the accounting cycle, reconciliation is performed between the subsidiary ledger activity and balances, and the general ledger activity and balances using an automated reconciliation tool. An automated reconciliation tool may be provided that generates the results of the reconciliation and, through a user interface, displays the results to an operator. Any reconciling items between the subsidiary and general ledgers may be analyzed and resolved by the operator. Through the operator interface, the operator updates the status of the reconciling items to indicate the results of the analysis. As reconciling items are resolved, the operator triggers the automated reconciliation facility to repeat the reconciliation and display the results.

The book and tax accounting logic 146 also provides information for financial and operational analysis. Information related to the status of the book and tax accounting logic is provided to operations through an accounting console. The accounting console is a management and operational workflow tool that includes notifications and status information related to the book and tax accounting processes. It also provides summarized reports and the ability to view the detailed information supporting those reports.

A preferred implementation of the securitization logic 32 and subcomponents thereof will now be described. The securitization logic 32 includes sifting/sorting logic 152 which accesses inventory, identifies collateral or asset attributes and sub-attributes, and categorizes data at its most granular level in both aggregating and segregating cash flows associated with mortgage assets. The sifting/sorting logic 152 provides a user interactive application that allows users to define selection criteria (loan and/or-atomic characteristics), prioritize them, evaluate results, and make decisions about market transactions and their related economics. By sifting and sorting through available inventories, cash flows may be qualified and quantified for optimal aggregation of targeted transactions, given relative market value. The sifting/sorting logic 152 operates under a user maintainable library of business rules associated with mortgage instruments and respective cash flows. An auto sift function is also provided to allow to batch processing of predefined inventory types. For example, a daily auto sift may be executed against "a vailable for sale" loans to aggregate and pre-packet the loans for future transactions.

The purpose of the sifting/sorting logic 152 is to provide a mechanism by which users can examine the entire collateral universe and pair down to smaller groupings of collateral or assets within the universe. Collateral refers to any cash flow derived from loans, pools, securities, commitments, and packets. The purpose of sorting is to group the subset of collateral identified in the sifting process and organize it by a single or multiple attributes to further refine the pool of candidate collateral to be placed into a potential packet. The sifting/sorting logic 152 supports the packeting logic 154, described below.

The packeting logic 154 is used to create, maintain, and otherwise support packets. A packet is an aggregation or packaging of cash flows that is treated as an entity separate and distinct from the incoming cash flows that support the packet and from the cash flows that result from the packet. Packets maintain the data integrity of the underlying assets as received by the LPC logic 102 and create an information chain that maps to a higher-order asset (e.g., an MBS or other financial instrument to be sold to an investor). The source data for packets may be loan-level or packet-level information, and the packets themselves may represent actual securities or just a unit of reporting and remittance.

Packets permit the data-processing system 12 to enable and support new transactions by providing a platform for sourcing, normalizing, and centralizing cash flow-related data and building the linkages between loan assets and securities or non-securitized assets. Packets provide greater flexibility in the transformation of cash flows from the primary mortgage/loan level to the secondary market and within the secondary market. Packets provide the flexibility not only to create and sell securities to investors but also to support non-securitized forms of packaging to enable selling or retaining cash flows from individual loans. The ability to create and manipulate packets enables the creation of new types of financial instruments and new types of transactions within the secondary market.

Figure 6:
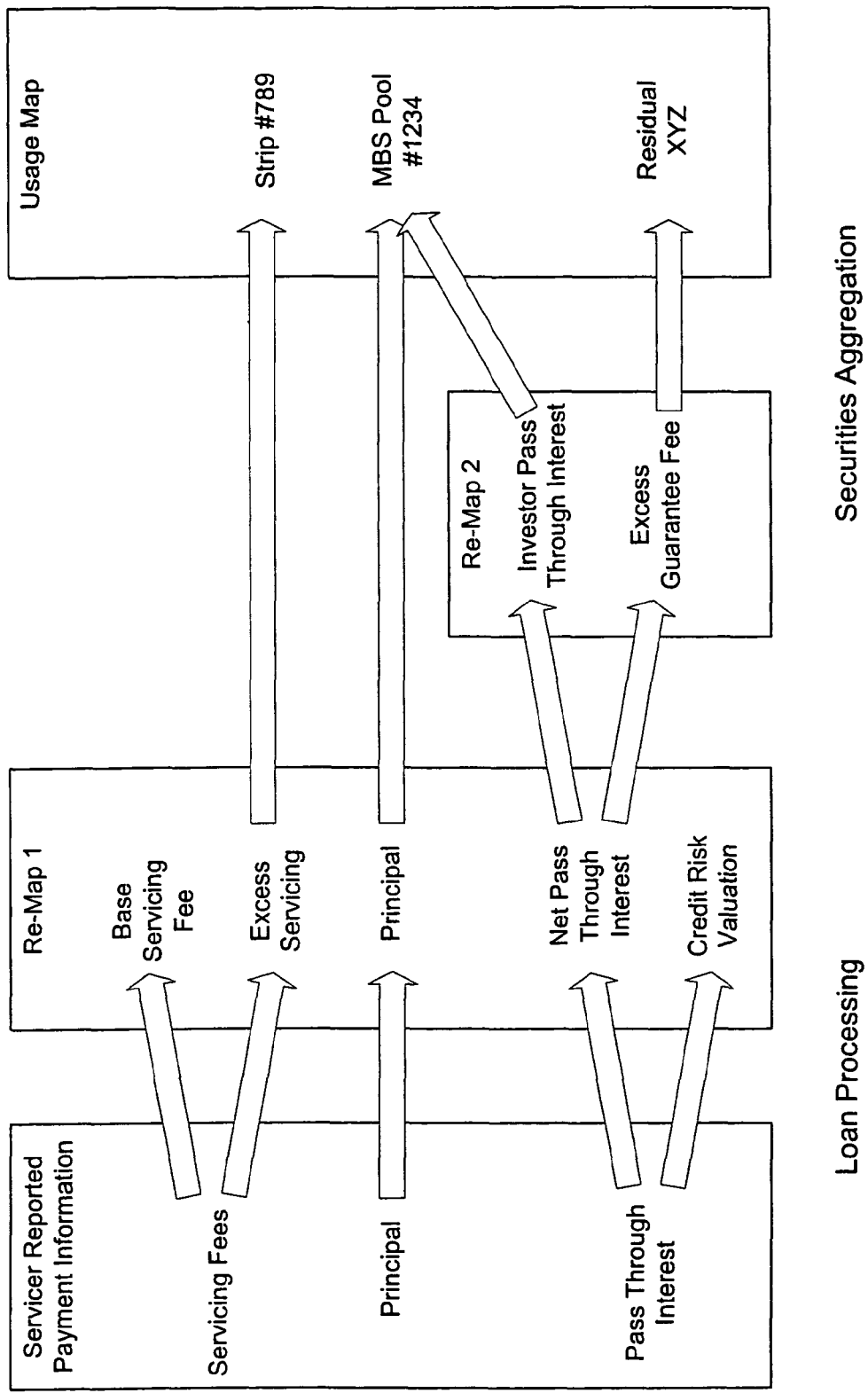
FIG. 6 is an exemplary data map used in connection with packeting logic in the system of FIG. 1.

FIG. 6 depicts a sample data map from a lender reported inbound record, through re-map, to packets. In the example of FIG. 5, a loan acquired on a cash basis has a portion of its cash flows re-mapped, and some of those cash flows participate in two packets, one an out-of-Portfolio MBS pool, the other an excess servicing fee strip. In this arrangement, the incoming data and cash flows is decoupled from the outgoing data and cash flows. This separation allows the timing and collection of cash flows from servicers to be treated independently from timing of payments to investors. This is useful in the case of structured transactions.

Packets preferably store the following four categories of data: packet header information (creation, purpose, and transaction information); cash flow and disclosure uses (data map); periodic process instructions and information; output requirements information. Thus, a packet stores information about its own attributes, the disposition of its cash flows, and any reported output, including disclosure data. Additionally, a packet stores information that describes its behavior, which may be derived from external business rules. These business rules may be standard (as in the case of MBS packets), or they may apply to a specific packet (as in the case of a structured transaction). Packet data fields may be added or changed to support new products.

In some cases, it may be necessary to apply data decomposition (or "internal re-mapping") to lender reported data. Some of the data decomposition steps may precede packet creation and rollup, converting loan level data reported by lenders into a form useful to downstream processes. In cases where the internal use of lender reported inbound data is differs from its use within a packet, data re-mapping is also required for roll-up.

The accounting logic 156 supports additional accounting functions for the securitization logic 32 that are not already supported by the book and tax accounting processor 146. In general, the book and tax accounting processor 146 is responsible for performing maintenance accounting at the loan level (i.e., posting transactions), while the accounting logic 156 is responsible for the accounting logic associated with transformative accounting events. Transformative accounting events include, for example, securitization events (in which a loan is to be construed to be sold). Other transformative events include a securitization event in which only a portion of the cash flows are sold, a sale event of a portfolio securities, and a sale event involving a whole loan. In addition, the accounting logic 156 is responsible for ongoing maintenance in connection with the reconciliation of securities cash payables. The accounting logic 156 performs such things as deriving the initial cost basis at the time of acquisition for every loan and inventory, maintaining the cost basis of each loan, tracking accounting intent for each loan, and performing market valuation for each loan. Of course, although the functionality of blocks 146 and 156 are shown as being conceptually separate, this functionality could also be combined.

The position monitor 158 allows monitoring of the purchaser's overall trade and investment position. Particularly, the position monitor 158 is an interactive tool that is usable to monitor positions of investors of whole loans and securities, and designate or redesignate inventory between trading accounts. The position monitor 158 is able to provide this information in near real time because the position monitor 158 either uses the same transactional database(s) as the servicer and investor reporting logic 30 and the securitization logic 132 or, preferably, uses a separate data base that is synchronized with these data bases. For both whole loans and securities, the position monitor 158 provides daily and month-to-date commitment/trade and delivery/settlement positions. The position monitor 158 also provides cumulative inventory positions held by the portfolio. The position monitor 158 allows investors to manage inventory from an economic, risk management, and regulatory accounting and taxation perspective. It also allows investors to determine or designate what assets to buy, what assets to sell, and what assets to retain or hold for investment. The portfolio manager 158 provides investors with a clear and concise view of their current net position of inventory.

The out of portfolio (OOP) pooling logic 160 permits the data processing system 12 to be used for pooling loans to create financial instruments in situations where the loans are owned by the entity that owns or operates the data processing system 12 or by an entity other than the entity that owns/operates the data processing system 12. The OOP pooling logic 160 provides the owner of the loans being pooled with the ability to select asset attributes and sub-attributes at a granular level, the ability to select loans to optimize chartered pool statistics, the ability to flexibly map incoming and outgoing cash flows, and the ability to use an on-screen display to manipulate collateral. The out of portfolio pooling processor 160 also has the ability to collateralize asset cash flows as described above in connection with the packeting logic 154.

The whole loan trading logic 162 provides a facility for engaging in whole loan trades to permit the owner or operator of the data processing system 12 to identify and sell loans out of its portfolio to other entities. The whole loan trading logic 162 also provides logic for reporting to the servicer of a sold loan (1) that the loan has been sold and (2) the identity of the new owner of the loan, allowing the servicer to begin reporting payment information to the new owner.

Referring to FIG. 6, the common services logic 34 includes work flow processor 170 which generates notifications about required actions and routes the notifications to users of the data processing system 12 according to pre-defined processing sequences for request approvals and exception report resolutions. The work flow processor 170 also keeps track of status and actions related to work items.

The report processor 172 generates reports based on users' requests. The report processor 172 allows data to be extracted from the data bases to prepare reports that can be sent out through the user services logic 22. The reports that are returned may be bulk transfers of data. The report processor 172 supports generating the reports described above in connection with the acquisition logic 28, the servicer and investor reporting logic 30, and the securitization logic 32.

The database and access control logic 174 provides database and user security administration and control for the databases in the data storage system 38 and functions available through system 12. The database access and control logic also maintains referential integrity, processes queries and updates, and performs all tasks related to access and control of the databases in the data storage system 38.

The process controller/scheduler 176 triggers execution of processes based on time schedule and/or events received from application components. The process controller/scheduler encapsulates information on processing interdependencies between different components in the data processing system 12.

The audit logging logic 178 logs data that is needed for historical tracking of the activities of the data processing system 12. The purpose of the data logging is primarily to meet audit requirements in connection with the transactions processed by the data processing system 12.

The business rules processor 180 is a rules engine that encapsulates business rules to permit the business rules to be applied to the loan data. Examples of the business rules applied by the rules processor 180 have been described throughout the discussion of the data processing system 12. A user interface is provided that allows the business rules to be modified and that allows new business rules to be added or obsolete business rules to be deleted. The rules processor 180 maintains the business rules separate from the remainder of the application code that implements other aspects of the data processing system 12. This allows the business rules to be modified/added/deleted without requiring revisions to the application code. The ability to modify or add business rules quickly facilitates the introduction of new types of loan products and investment instruments, because the data processing system 12 may be easily modified to implement any special data processing required for the implementation of the new loan products/investment instruments. Preferably, the rules processor 180 is provided as three separate rules processor, one for each of the acquisition logic 28, the servicer and investor reporting logic 30, and the securitization logic 32, with separate user interfaces for each rules processor.

Figure 7:
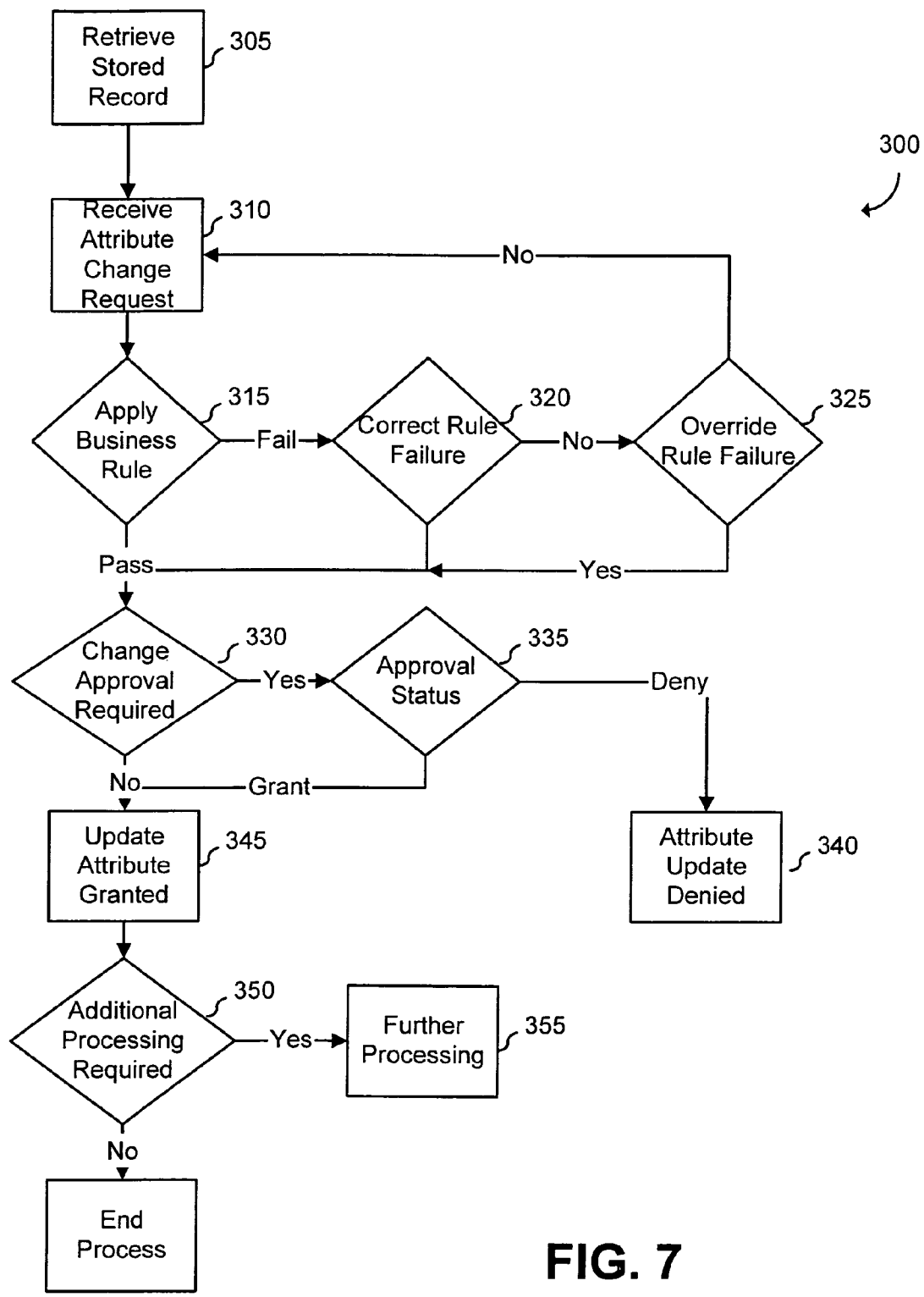
FIG. 7 is a flow chart showing operation of an attribute change processor in greater detail.

Referring now to FIG. 7, operation of the attribute change processor logic 122 is described in greater detail. FIG. 6 illustrates a method 300 of processing loan or security level changes to attributes or other data describing characteristics of assets that have been brought into data processing system 12 is shown.

Method 300 is usable to process unexpected or unscheduled attribute change requests that are received in data processing system 12 as described above in reference to attribute change processor logic 122. The unexpected or unscheduled attribute change request can be received from any input to the system although generally, the attribute change request will be received from the user systems 14.

Independent of the type of attribute change or the reasons giving rise to the change, the requirement that an attribute change is needed will be reported to a user of data processing system 12. Alternatively, the user of data processing system 12 may independently determine the need to change one or more attributes in one or more financial assets previously submitted to data processing system 12. Yet further, a user of data processing system 12 may wish to add a new attribute to an existing loan record or set of loan records. The user will make a determination that a loan previously submitted to data processing system 12 contains the attribute needing to be changed or added and access data processing system 12 to implement the proposed change or addition.

In a step 305, the system 12 retrieves a record embodying the loan containing an attribute to be changed from the data storage 38 associated with the data processing system 12. According to an exemplary embodiment, the process of retrieving the record containing the attribute to be changed can be managed in accordance with user inputs received by user services logic 22. The user can use a previously issued login name and password to access the functionality provided through user services logic 22 from any remote or local processing system.

Upon accessing user services logic 22, the system provides the user with a search form for searching the database associated with data processing system 12. The search report can be as simple or as detailed as needed to retrieve the loan information from the database. According to a preferred embodiment, the complexity of the search function form can be customized based upon the login name to provide a preferred search report that is most likely to be useful to the user associated with the login name. Additionally, the information that the user is capable of retrieving from the database can be customized based on the login name. For example, a given user may be given access only to financial assets associated with that particular user.

According to an exemplary embodiment, the search report can include attribute fields to search for a particular loan number, search for a cash flow, a packet, a loan pool, a contract search, an existing attribute change record, described below, or any other discrete indexed field. Where a search request yields a single record, that record can be displayed to the user. Where a search request yields multiple records, a navigable list can be displayed to the user, allowing the user to select at least one financial asset record of interest.

According to an exemplary embodiment, attribute change processor logic 122 includes functionality to allow a user to submit a meta attribute change request that can affect a plurality of financial assets. An example may occur where the records associated with the user contain an attribute field including an address associated with the user and the user has changed his address. The user may use the search logic to retrieve all previously stored records that are associated with that user and submit an attribute change request, described below, to update the address attribute field on all of the retrieved records.

Following retrieval of the information from the database, the user will be able to select a specific financial asset record or group of financial asset records to be the target of an attribute change request. According to an exemplary embodiment, following selection of the specific financial asset or group of assets, a search can be made to determine whether there exists any pending attribute change requests associated with the asset or assets. The user can be notified if any pending attribute change requests are associated with the selected asset or assets.

Following retrieval of the asset information from the database, the current asset information can be displayed to the user. According to an exemplary embodiment, the asset information can be displayed in a form including updateable fields that contain all of the attribute fields that the user is authorized to modify.

In a step 310, the user can modify information in the updateable form and submit the form to system 12. The form containing the attribute fields that have been modified by the user will be submitted to data processing system 12 and will become the attribute change request upon submission. According to an exemplary embodiment, the attribute change request displayed to the user can be customized to permit only reasonable attribute change modifications. For example, if the user attempts to enter an letter to update an attribute field that is a number, such as an interest rate, the error can be communicated to the user.

When the user has completed the attribute change request, the user can be provided with an option to finalize the attribute change request. Prior to finalizing the attribute change request, the user may be provided with an opportunity to review the pending change. The user may be further provided with information relative to any effects that pending attribute change request will have. An example may include where an attribute change will have an effect on a pricing value determined at least in part based on the attribute.

A change request is an indication on the part of the user that the user desires that the change be made to the selected record independent of the effect the change may have on existing pools, current pricing values, and so on. However, the proposed attribute change may still be denied by data processing system 12 based on a violation of one or more business rules, as described below.

According to an exemplary embodiment, when the attribute change request is received by data processing system 12, it is placed in a processing queue for rules processor 180. When reviewed, rules processor 180 will make a determination in a step 315, based on stored rules, whether the proposed changed to the selected financial asset is authorized. The rules to be applied can be logical rules, such as whether the submitted change makes sense in the context of the selected loan, loan specific rules, such as whether the proposed change is inconsistent with other information stored regarding the loan, business rules, such as whether the proposed change can be made given rules associated with data processing system 12, and/or any other type of rules that could affect acceptance of the attribute change request.

If a business rules failure is indicated, the failure may be reviewed by an administrator in a step 320 to determine the disposition of the attribute change request following the business rules failure. The disposition may be dependent on the nature of the business rules failure. For example, where an obvious error was made during entry, the obvious error can be corrected. Alternatively, where the failure cannot be reconciled by the administrator, the user can be notified to provide the user with an opportunity to correct the deficiency and resubmit the attribute change request. Further alternatively, for relatively minor changes or changes otherwise determined to not require further review, such as the above described update to an address associated with a loan record, the process will not need approval or any human invention prior to implementation, as long as the applicable business rules are satisfied.

Alternatively, in limited circumstances, the administrator may be given the capability to overrule the business rule applied by business rules processor 180 in a step 325. Where the business rule is overridden, the administrator may be given the option of overriding the business rule for the specific attribute change request or modifying the business rule applied by the business rule processor to effect a permanent change in the rule.

According to an exemplary embodiment, a determination is made in a step 330 whether an attribute change request requires further approval prior to changing the attribute. Prior approval may be required where the proposed change needing approval cannot easily be converted to a business rule, where a law or regulation demands that further scrutiny is required prior to changes, or any other circumstances that may arise.

A determination is made in a step 335 whether the proposed change is approved following application of the business rules by rules processor 180. If the proposed change is not granted, the attribute change is denied in a step 340 and the reasons for the denial can be communicated to the user.

If no prior approval is required, or if the approval is granted, the attribute change can be implemented in a step 345. Implementing the attribute change request can include updating the record associated with the financial asset in the database. Following the update, the successful attribute change can be reported to the user that submitted the attribute change request.

Following an attribute change request, a determination is made whether the change has an effect on other information or assets that are dependent or related to the attribute in a step 350. If necessary, the financial asset can be subjected to further processing based on the attribute that was changed and the significance of the change in a step 355. For example, an attribute change may result in a change in loan pricing, and more specifically the purchase price that should have been paid to the seller of the loan subject to the attribute change. Therefore, the attribute change processor logic 122 is coupled to the pricing logic 86 and sends the pertinent data regarding the change to the pricing logic 86. When pricing logic 86 is invoked, acquisition logic 28 is configured to "redeliver" to loan to LPC logic 100. Following delivery, normal processing of the loan occurs such that revised pricing information is generated. The pricing logic 86 then returns revised pricing information for the loan in question so that a price adjustment may occur. An additional example of further processing is processing that may occur when a change to an attribute has ramifications on additional attributes such that the additional attributes will require updating based on the change.

Figure 8:
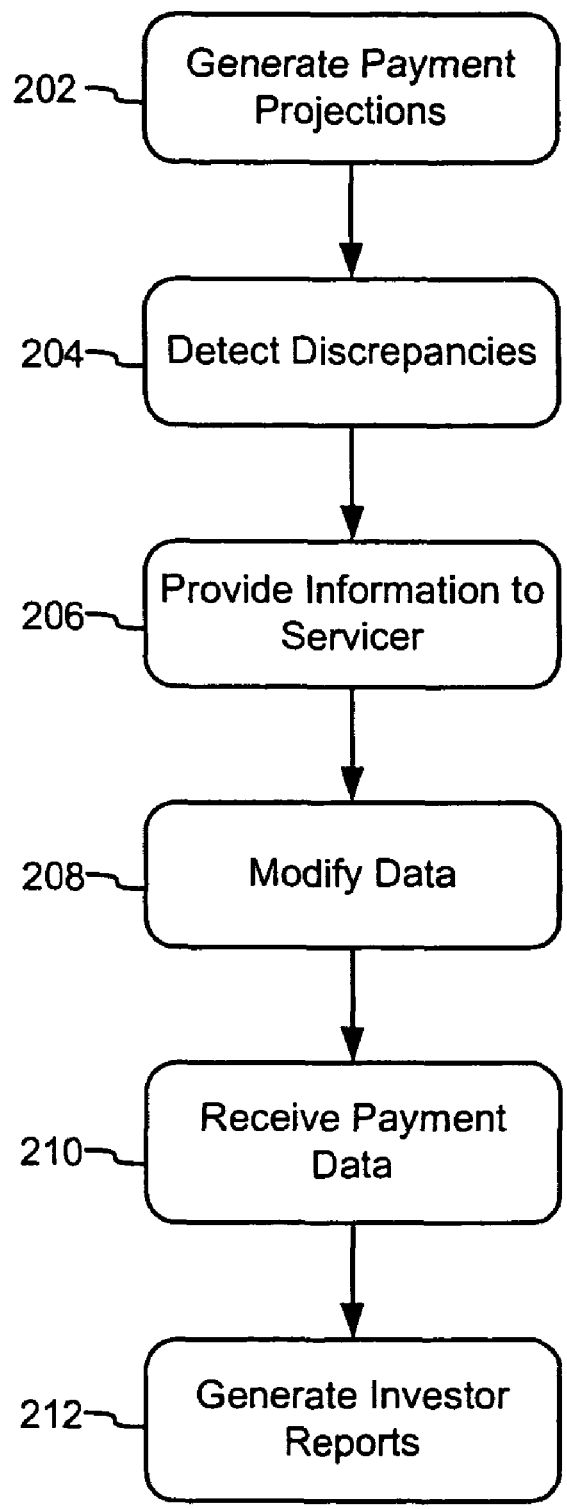
FIGS. 8-10 are flow charts showing operation of servicer and investor reporting logic of the system of FIG. 1 in greater detail.
Figure 9:
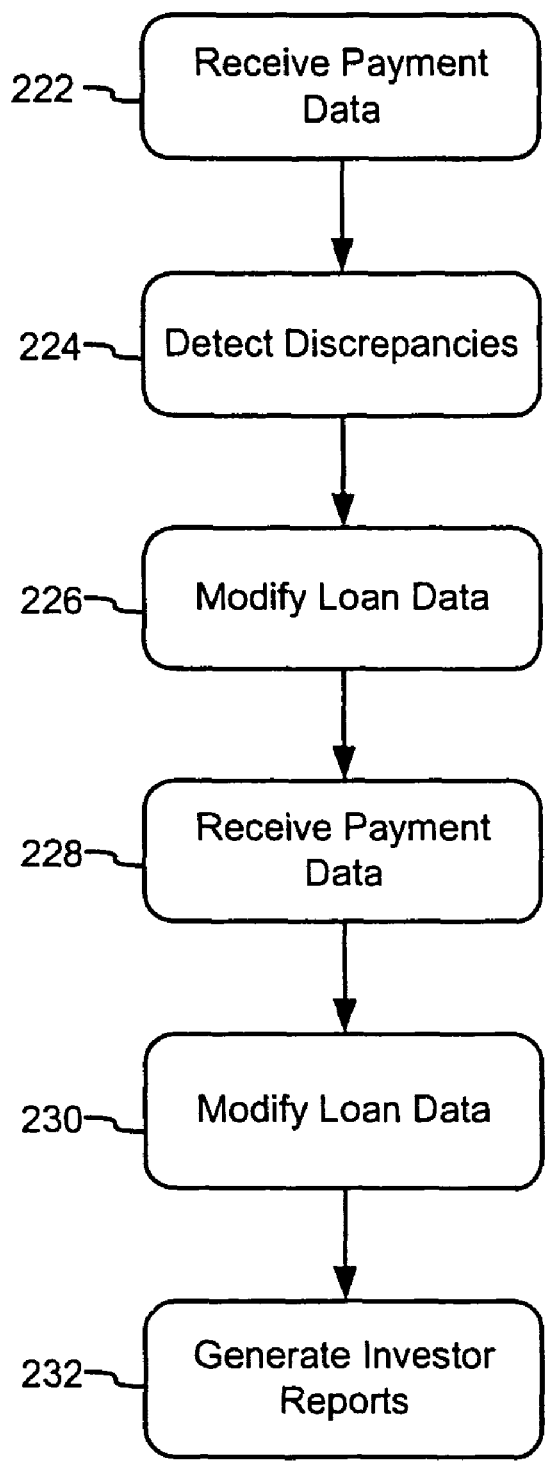

Referring now to FIGS. 8-9, additional detail will now be provided regarding the manner in which the data processing system 12 preferably facilitates accurate and timely reporting of loan payment data by servicers. Again, although the invention is described in terms of meeting particular needs and having certain advantages, it will be appreciated that processes and systems may be constructed which employ the concepts described herein but do not necessarily meet the same needs or have the same advantages.

Initially, it may be noted that a number of features have already been described above which facilitate timely and accurate reporting of loan payment data. For example, as discussed in connection with FIG. 3B, the data processing system 12 includes the LPC logic 100 and the ACP logic 122 which provide tools usable for assisting in identifying and correcting loan data errors and which are accessible to the servicer by way of a web interface. As previously described, the LPC logic 100 includes loan set up and compare logic that performs a comparison of the servicer's data for loans with the purchaser's data for the same loans. This logic provides a facility for servicers to download data at acquisition to ensure the same loan data is used by the data processing system 12. A similar compare facility can be used when servicing transfers occur that transfer servicing responsibility from one servicer to another. Thus, errors in loan data may be detected early at the time of delivery without waiting until the MBS roll-up process. Likewise, the LPC logic 100 includes the amortization/calculation processor 104 which, as described in greater detail below, is usable to generate projections regarding principal and interest payments so that such projections may be used to assist early error detection. Further, in situations where the error is in the data maintained by the data processing system 12, the ACP logic 122 provides a tool that assists error correction. Error correction during and after loan set-up and compare preferably allows the servicer to forgo reporting MBS-level information and report only loan level information. Further, it is possible for servicers to report data up until shortly before the investor reporting deadline, while also giving servicers sufficient opportunity to correct data.

With reference to FIG. 8, a flow chart showing operation of the data processing system 12 according to a preferred embodiment is illustrated. In the process of FIG. 7, projections of interest and principal payment are generated and used to detect errors.

Thus, at step 202, payment projections are generated regarding a plurality of home mortgage loans. The plurality of loans may include all loans for which data is maintained in the data processing system 12, or only a subset of such loans such as a group of loans that are serviced by a particular servicer, a group of loans that form collateral for a particular security, and so on. The projections are generated on a loan by loan basis and may include projections regarding the principal payment expected to be received from a borrower for a particular month, the interest payment expected to be received from the borrower for the particular month, the resulting unpaid principal balance, and so on. For a particular pool of loans, pool-level information may be generated based on the loan-level information. Projections can be made based on stored data regarding the characteristics or attributes of the loans (e.g., interest rate) and other historical, loan level data (e.g., current unpaid principal balance). The projections are preferably generated more than one week prior to the MBS reporting deadline to give the servicer sufficient opportunity to correct any errors. For example, the payment projections may be generated approximately at a beginning of the reporting cycle (i.e., about 30 days in advance of the MBS reporting deadline) or during a prior reporting cycle (e.g., 60 days in advance of the MBS reporting deadline).

At step 204, it is determined that the payment projections have errors and, at step 206, information regarding payment projections is provided to a loan servicer. The combination of steps 204 and 206 may be performed in a variety of ways. For example, in one embodiment, the data processing system 12 may determine that errors exist by receiving corresponding projections from the servicer and by comparing, on a loan by loan basis, the projections generated by the data processing system 12 with the projections generated by the servicer. Thus, for example, if a particular ARM loan is scheduled for a rate change, but the servicer and the purchaser are not in agreement as to the nature or timing of the change, the discrepancy in understanding will manifest itself as a discrepancy in projections. The servicer may then be provided with information regarding the projections in the form of a list of loans for which discrepancies exist, preferably ranked in terms of dollar amount or some another factor indicative of the severity of the discrepancy. The servicer may also be provided the ability to drill down on loans in the list to display additional information the loan characteristic data. In another embodiment, projections may be provided to a data processing system of the servicer and the servicer data processing system may perform the comparison.

Discrepancies in the projections may be caused by either errors in the data describing characteristics of the loans (unpaid principal balance, interest rate, and so) maintained by the data processing system 12 or the corresponding data maintained by the servicer. At step 208, in the event the error is in the data maintained by the data processing system 12, the data in the data processing system 12 is modified to eliminate any errors. Step 208 is preferably implemented by providing the servicer access via the Internet to the ACP logic 122. The data may then be modified based on the information regarding proposed corrections received by the ACP logic 122 from the servicer. Of course, depending on the change, further approval may be required.

At step 210, principal and interest payment data and other servicing data for the plurality of loans is received during the course of the normal reporting cycle. Assuming no unexpected or unscheduled events occur (e.g., delinquencies, prepayments or curtailments), the data received from the servicer should match the projections. Preferably, only loan level data is received and the servicer does not need to report security-level data. The servicing data is preferably received less than one week prior to the reports being generated for the investors, and more preferably only a couple of days or less in advance. Thereafter, at step 212, reports relating to the principal and interest payments for the plurality of home mortgage loans are generated for investors in the security.

With reference to FIG. 8, a flow chart showing operation of the data processing system 12 according to another preferred embodiment is illustrated. In the process of FIG. 8, the servicer is provided the opportunity to report payment data at multiple times during the MBS reporting cycle.

Thus, at step 222, a first set of payment data is received from a servicer for a plurality of loans. The payment data is pertinent to the current MBS reporting cycle. At step 224, it is determined that discrepancies exist between the servicer data and the data maintained by the data processing system 12. Again, the determination in step 224 may be made by comparing, on a loan by loan basis, the data provided by the servicer with data expected by the data processing system 12 (as calculated by the LPC logic 100). The servicer may then be provided with information regarding the projections in the form of a list of loans for which discrepancies exist, preferably ranked in terms of dollar amount or some another factor indicative of the severity of the discrepancy. As such, servicers do not have to research what loans from a pool of loans are causing problems and may focus on the loans causing the most serious problems first. The servicer may also be provided the ability to drill down on loans in the list to display additional information the loan characteristic data. In an alternative embodiment, data stored in the data processing system. 12 may be downloaded to the servicer data processing system at step 222 and the servicer data processing system may perform a comparison at step 224.

At step 226, a first error correction is performed in connection with the plurality of loans based on the first set of payment data. Again, the servicer is preferably provided access to the ACP logic 122. The error correction may then be performed based on information received by the ACP logic 122 from the servicer regarding proposed corrections.

At step 228, a second set of payment data is received from the servicer for the plurality of loans. The second set of payment data is pertinent to the same payment cycle as the first set of payment data. The second set of data for the plurality of loans may include data for all of the plurality of loans. Alternatively, the second set of data for the plurality of loans may include data for only those loans in which the servicer's data has changed and/or for those loans in which the servicer is otherwise interest in obtaining confirmation that its data is consistent with the data maintained in the data processing system 12. The second set of data being received on a day which is one or more days closer to a security reporting deadline than the first set of payment data.

At step 230, a second error correction is performed in connection with the plurality of loans based on the second set of payment data. The second set of payment data may be performed less than one week prior to the reports being generated for the investors. Although not shown in FIG. 8, payment data may be received one or more additional times before MBS roll-up. Thereafter, at step 232, reports relating to the principal and interest payments for the plurality of home mortgage loans are generated for investors in the security.

Thus, in FIG. 9, servicers submit loan level transactions more than once a billing cycle. Each time the payment data is received, the payment data to is processed to produce processed data and information regarding the processed data (e.g., detected errors) is made available to the servicer. For example, servicers can report January data any time up to February 2 (e.g., shortly after January 15), and again on February 2. The data processing system 12 is capable of processing multiple servicer reports for the same group of loans, allowing servicers more time to correct data in connection with earlier reported data, while still offering a later reporting deadline to capture data that occurs later in the month. Therefore, if most of the payment data is generated by January 16, this data can be reported with plenty of time to correct errors. Once reports are received, the data processing system 12 identifies errors and can display them for correction by the servicer.

Other features may be implemented to facilitate reporting. For example, rounding differences (e.g. within a small tolerance of one or two cents) resulting from differences between what the servicer reports at the loan level and the data in the data processing system 12 may be absorbed by one or both parties. Also, where use of projections results in over-collateralization, servicers can later be reimbursed. Further, checks can also be included in securitization processes to ensure that loans being pooled meet the parameters of the pool. Controls can be included in the logic to determine that the right loans are in the right pools.

Of course, in each of the above flowcharts, fewer or additional steps may be included depending on the implementation chosen. Additionally, although the steps are shown as being performed in a particular order, it will be understood that some of the steps may be performed simultaneously or in a different order.

Referring again to FIG. 1, as previously indicated, service granularity is achieved in part by representing loans as a series of data attributes. The following is an example of a set of attributes that may be used to characterize loans: accounting class code; accounting close effective period; accounting reporting category code; actual UPB at acquisition; adjusted last paid installment date; adjusted unpaid principal balance; ceiling; change frequency; change method; conduit code; custodian code; downward cap; downward cap code; effective date; excess yield; excess yield adjustment; extended term; purchaser loan number; final step change; first PITI (principal, interest, taxes, insurance) due date; fixed interest rate; fixed pass-thru rate; fixed payment amount; floor; frequency of payment change; frequency of rate change; future feature code; index code; index lookback; interest rate; loan guaranty payment date; loan conversion date; loan guaranty date; loan payoff interest calculation code; loan rate effective date; loan to value ratio; LP control record; lender pass through (LPT) type code; maximum term; months payment control effective; months rate control effective; mortgage margin; mortgage term; net interest adjustment; new payment amount; next control record; next scheduled payment change date; next scheduled rate change date; number of months in effect; other fees collected adjustment; pass-thru rate; payment change amount/percentage; payment change method code; payment control record; payment type code; principal adjustment; processing status code; product code; rate change method code; rate change percent; rate control record; rate conversion status code; rate rounding method; rate type code; reclassification date; remittance day code; required change index; required margin; secured unpaid principal balance; servicing fee; servicing fee adjustment; servicing fee type; servicing remittance option; unpaid principal balance; upward cap; upward cap code. In addition to the above-mentioned attributes, additional attributes may be used in connection with particular types of specialty loan products.

As previously indicated, data granularity is achieved at least in part by decomposing loan assets into a series of cash flows. A cash flow may be any type of payment, whether of principal, interest, or fees. Cash flow may also includes credit-related losses, which manifest themselves from the securities standpoint as negative investor payments (i.e., a reduction to positive cash flows). Possible sources of cash flow may be associated with principal, interest, servicing fees, guarantee fees, mortgage insurance, prepayment penalties, borrower-paid fees, servicer advances, servicer recoveries, loss/default components, and REO activity. For principal, individual cash flows that may be identified include the following: scheduled principal (amount payable based on scheduled amortization), actual principal (what was applied as principal), unscheduled principal (amount from borrower applied in excess of scheduled), advanced (amount not collected from borrower but remitted to investor), shortfall (underpayment from borrower, usually meaning less than full scheduled amount). For interest, individual cash flows that may be identified include the following: scheduled Interest (amount payable), actual (what was applied), excess (interest collection in excess of amount payable), advanced (not collected from borrower but sent to investor), shortfall (underpayment from servicer), capitalized (negative amortization), other capitalized interest (delinquency), unrecoverable prepayment interest shortfall. For servicing fees, individual cash flows that may be identified include the following: gross servicing fee, core servicing fee (usually relates to tax), excess servicing fee, safe harbor (tax). For guarantee fees, individual cash flows that may be identified include the following cash flows: gross guarantee fee (GF) (total charged to the lender), cash flows for internally tracking costs (e.g., costs associated with credit risk), base GF, GF variance, and other GF adjustments. For mortgage insurance (MI), individual cash flows that may be identified include the following: lender paid MI, borrower paid MI, portion of GF construed to be MI, back-end MI. For prepayment penalties, individual cash flows that may be identified include the following: prepayment penalty, prepayment penalty (borrower-paid), yield maintenance fee (borrower-paid). For borrower-paid fees, individual cash flows that may be identified include the following: borrower-paid fees, late payment fee, conversion/modification fee. For seller advances, individual cash flows that may be identified include the following: advanced principal, advanced interest, advanced guaranty fee, servicing advances (usually relates to defaults, e.g., T&I). For servicer recoveries, individual cash flows that may be identified include the following: recovered principal advances, recovered interest advances, recovered guaranty fee advances, recovered servicing advances. For default activity, cash flows that may be identified include the following: net realized loss (total amount payable to investors less all recoveries), foreclosure expenses, attorney fees, recoup of non-recoverable advances, loss due to modification, loss due to appraisal reduction, loss due to deficiency valuation, non-capitalized deferred interest (e.g. workout), interest paid on advances. For REO activity, cash flows that may be identified include the following: foreclosure sale proceeds, rental income, insurance proceeds, tax expenses on REO, repair expenses on REO, sale/marketing expenses on REO, REO property maintenance expenses. It may be noted that some of the above cash flows are aggregate cash flows that can be further decomposed. Other cash flow pertinent information that may be tracked includes unpaid principal balance (UPB) (including scheduled UPB and actual UPB), participation percentage (including principal participation percentage, interest participation percentage, and servicing fee participation (basis points)), discount rate (used to calculate yield maintenance or prepayment penalty), appraised balance, foreclosure sale date, and REO sale date.

Many other changes and modifications may be made to the present invention without departing from the spirit thereof. The scope of these and other changes will become apparent from the appended claims.

What is claimed is:

1. A computer-implemented data processing system for processing loan data for a plurality of loans, the data processing system comprising:
  a data storage system configured to store loan data for the plurality of loans;
  a user interface including one or more web pages configured to enable a servicer using a remote computing system to transfer loan data over the Internet to and from the data processing system, the user interface including
    a loan activity processing function configured to receive servicer loan data including loan activity data from the servicer when a loan payment activity occurs, the servicer loan activity data comprising data regarding payments received from borrowers and how the payments are to be applied towards paying unpaid principal, interest and fees associated with the plurality of loans,
    a trial balance processing function configured to enable the servicer to submit the servicer loan data for comparison with the stored loan data to check consistency between the servicer loan data and the stored loan data regarding the occurred loan payment activity, and to provide results of the comparison to the servicer, wherein loan data being compared comprises interest rate and current unpaid principal balance, and
    a loan level browsing function configured to allow the servicer to view stored loan data and the results of the comparison; and
  loan process and compare logic, including
    an amortization/calculation processor configured to perform validation calculations on the servicer loan data regarding the occurred loan payment activity based on the stored loan data,
    a loan activity processor configured to
      process the servicer loan activity data,
      validate the servicer loan activity data based on the stored loan data, and update the stored loan data based on the servicer loan activity data, wherein the validation of the servicer loan activity data comprises performing validation calculation based on the stored loan data and business rules regarding how the payments received from the borrowers are to be applied towards paying unpaid principal, interest and fees associated with the plurality of loans, and
    a trial balance processor configured to compare the servicer loan data with the stored loan data.

2. A system according to claim 1, wherein the amortization/calculation processor is configured to derive expected principal and interest amounts based on the stored loan data.

3. A system according to claim 1, wherein the amortization/calculation processor is configured to calculate disbursements due under a reverse mortgage or a home equity line of credit.

4. A system according to claim 1, wherein the amortization/calculation processor is configured to calculate servicing fees due based on the stored loan data.

5. A system according to claim 1, wherein the loan activity processing function is configured to receive and validate loan activity data from the servicer.

6. A system according to claim 5, wherein validating the loan activity data includes validating a relationship between the servicer and the loan.

7. A system according to claim 5, wherein validating the loan activity data includes validating the timing of the activity based on a reporting period associated with the loan.

8. A system according to claim 1, wherein the trial balance processing function is configured to generate an exception based on a detected inconsistency between the servicer loan data and the stored loan data.

9. A system according to claim 8, wherein the loan activity processor further includes an exception resolution processor configured to process exceptions.

10. A system according to claim 9, wherein the exception resolution processor is configured to notify the servicer through the user interface when the inconsistency is detected.

11. A system according to claim 10, wherein the user interface includes an exception resolution function configured to allow a user to satisfy the exception.

12. A system according to claim 1, wherein the user interface includes input fields configured to receive loan activity data from a servicer.

13. A system according to claim 1, wherein the loan level browsing function is configured to allow a servicer to download the stored loan data.

14. A computer-implemented data processing system comprising:
- a data storage system configured to store loan data for mortgage loans; and
- user interface logic configured to implement a user interface, the user interface comprising one or more web pages configured to allow a servicer to perform functions implemented by a data processing system for processing the loans, the functions including
  - a loan activity processing function configured to enable a servicer to provide servicer loan data including servicer loan activity data to be processed by the data processing system when a loan payment activity occurs, the servicer loan activity data comprising data regarding payments received from borrowers and how the payments are to be applied towards paying unpaid principal, interest and fees associated with the plurality of loans,
  - a trial balance processing function configured to enable the servicer to compare the servicer loan activity data with loan data stored in the data storage system to check consistency between the servicer loan data and the stored loan data regarding the occurred loan payment activity, including to compare interest rate, unpaid principal balance and how the payments received from the borrowers are to be applied towards paying unpaid principal, interest and fees associated with the plurality of loans, and to provide results of the comparison to the servicer,
  - an exception handling function configured to enable a servicer to access and respond to exceptions generated by the data processing system, and
  - a loan level browsing function configured to enable a servicer to view the results of the comparison and to browse and download loan data stored on the data processing system and associated with the servicer.

15. A system according to claim 14, wherein the functions further include a security and access control function configured to receive and validate a servicer ID and servicer password.

16. A system according to claim 15, wherein the user interface is customized based on the servicer ID.

17. A system according to claim 15, wherein the functionality of one or more of the functions is customized based on the servicer ID.

18. A system according to claim 14, wherein the loan activity processing function is configured to display updated loan data based on the processing of the loan activity.

19. A system according to claim 14, wherein the trial balance processing function is configured to display servicer loan data alongside loan data stored on the data processing system to facilitate comparison.

20. A system according to claim 14, wherein the loan activity processing function includes a providing a plurality of input fields configured to receive loan identification data and loan activity data.

21. A system according to claim 14, wherein the loan activity processing screen is configured to display the results of the loan activity processing.

22. A system according to claim 21, wherein the result of the loan activity processing is generation of an exception.

23. A system according to claim 21, wherein the result of the loan activity processing is an update of loan data stored on the data processing system based on the loan activity.

24. A system according to claim 1, wherein the plurality of loans are a plurality of mortgage loans, and wherein the system further comprises financial asset generation logic, the financial asset generation logic including logic configured to facilitate creation and maintenance of a plurality of financial assets backed by the plurality of mortgage loans or by portions of the plurality of mortgage loans.

25. A system according to claim 24, wherein the plurality of financial assets include a plurality of mortgage backed securities.

26. A system according to claim 1, wherein the data processing system is operated by a purchaser of the plurality of mortgage loans.

27. A system according to claim 14, wherein the plurality of loans are a plurality of mortgage loans, and wherein the system further comprises financial asset generation logic, the financial asset generation logic including logic configured to facilitate creation and maintenance of a plurality of financial assets backed by the plurality of mortgage loans or by portions of the plurality of mortgage loans.

28. A system according to claim 27, wherein the plurality of financial assets include a plurality of mortgage backed securities.

29. A system according to claim 14, wherein the data processing system is operated by a purchaser of the plurality of mortgage loans.

* * * * *